United States Patent
Doi

(10) Patent No.: US 8,442,753 B2
(45) Date of Patent: May 14, 2013

(54) INVERTED PENDULUM VEHICLE WITH STABILITY ON A SLOPE

(75) Inventor: Katsunori Doi, Tokyo (JP)

(73) Assignee: Equos Research Co., Ltd. (JP)

( * ) Notice: Subject to any disclaimer, the term of this patent is extended or adjusted under 35 U.S.C. 154(b) by 556 days.

(21) Appl. No.: 12/672,769

(22) PCT Filed: Aug. 5, 2008

(86) PCT No.: PCT/JP2008/064052
§ 371 (c)(1),
(2), (4) Date: Apr. 7, 2010

(87) PCT Pub. No.: WO2009/022584
PCT Pub. Date: Feb. 19, 2009

(65) Prior Publication Data
US 2011/0098884 A1    Apr. 28, 2011

(30) Foreign Application Priority Data

Aug. 10, 2007  (JP) ................. 2007-210238
Aug. 10, 2007  (JP) ................. 2007-210317
Aug. 10, 2007  (JP) ................. 2007-210348

(51) Int. Cl.
*G05D 1/08*  (2006.01)
*B62K 17/00* (2006.01)
*B62K 1/00*  (2006.01)

(52) U.S. Cl.
USPC ............................ 701/124; 701/36

(58) Field of Classification Search ......... 701/36
See application file for complete search history.

(56) References Cited

U.S. PATENT DOCUMENTS

| | | | | |
|---|---|---|---|---|
| 6,003,624 A * | 12/1999 | Jorgensen et al. | ............. | 180/6.5 |
| 6,332,103 B1* | 12/2001 | Steenson et al. | ................. | 701/1 |
| 7,130,702 B2* | 10/2006 | Morrell | ......................... | 700/75 |
| 7,363,993 B2* | 4/2008 | Ishii | ............................... | 180/7.1 |
| 7,437,202 B2* | 10/2008 | Morrell | ......................... | 700/75 |
| 7,635,041 B2* | 12/2009 | Adachi | ......................... | 180/218 |
| 7,649,331 B2* | 1/2010 | Hosoda et al. | ........... | 318/568.12 |
| 7,798,264 B2* | 9/2010 | Hutcheson et al. | ......... | 180/65.1 |
| 7,962,256 B2* | 6/2011 | Stevens et al. | .................. | 701/22 |
| 7,979,179 B2* | 7/2011 | Gansler | ......................... | 701/38 |
| 2002/0121394 A1* | 9/2002 | Kamen et al. | ................... | 180/41 |
| 2006/0097683 A1* | 5/2006 | Hosoda et al. | ........... | 318/568.12 |
| 2006/0243499 A1* | 11/2006 | Hosoda | ......................... | 180/8.5 |

(Continued)

FOREIGN PATENT DOCUMENTS

| | | | |
|---|---|---|---|
| JP | 11230742 A | * | 8/1999 |
| JP | 2002-538891 | | 11/2002 |
| JP | 2004-129435 | | 4/2004 |
| JP | 2007-186184 | | 7/2007 |

*Primary Examiner* — Shelley Chen
(74) *Attorney, Agent, or Firm* — Bacon & Thomas, PLLC

(57) ABSTRACT

The gradient of a road surface is estimated with a change in the attitude of a vehicle also taken into consideration. As a result, the gradient of the road surface can be estimated with high accuracy, and this enables the vehicle to stably stop and travel independently of the gradient of the road surface. The vehicle has a drive wheel rotatably mounted on a vehicle body and also has a vehicle control device for controlling the attitude of the vehicle by controlling drive torque applied to the drive wheel. The vehicle control device estimates the gradient of the road surface based on the attitude of the vehicle and corrects the drive torque based on the gradient.

7 Claims, 17 Drawing Sheets

U.S. PATENT DOCUMENTS

2008/0039990 A1* 2/2008 Stevens et al. .................. 701/22
2008/0161990 A1* 7/2008 Gansler .......................... 701/29
2008/0319627 A1* 12/2008 Kamen et al. ................... 701/93
2010/0217497 A1* 8/2010 Kamen et al. ................... 701/70

* cited by examiner

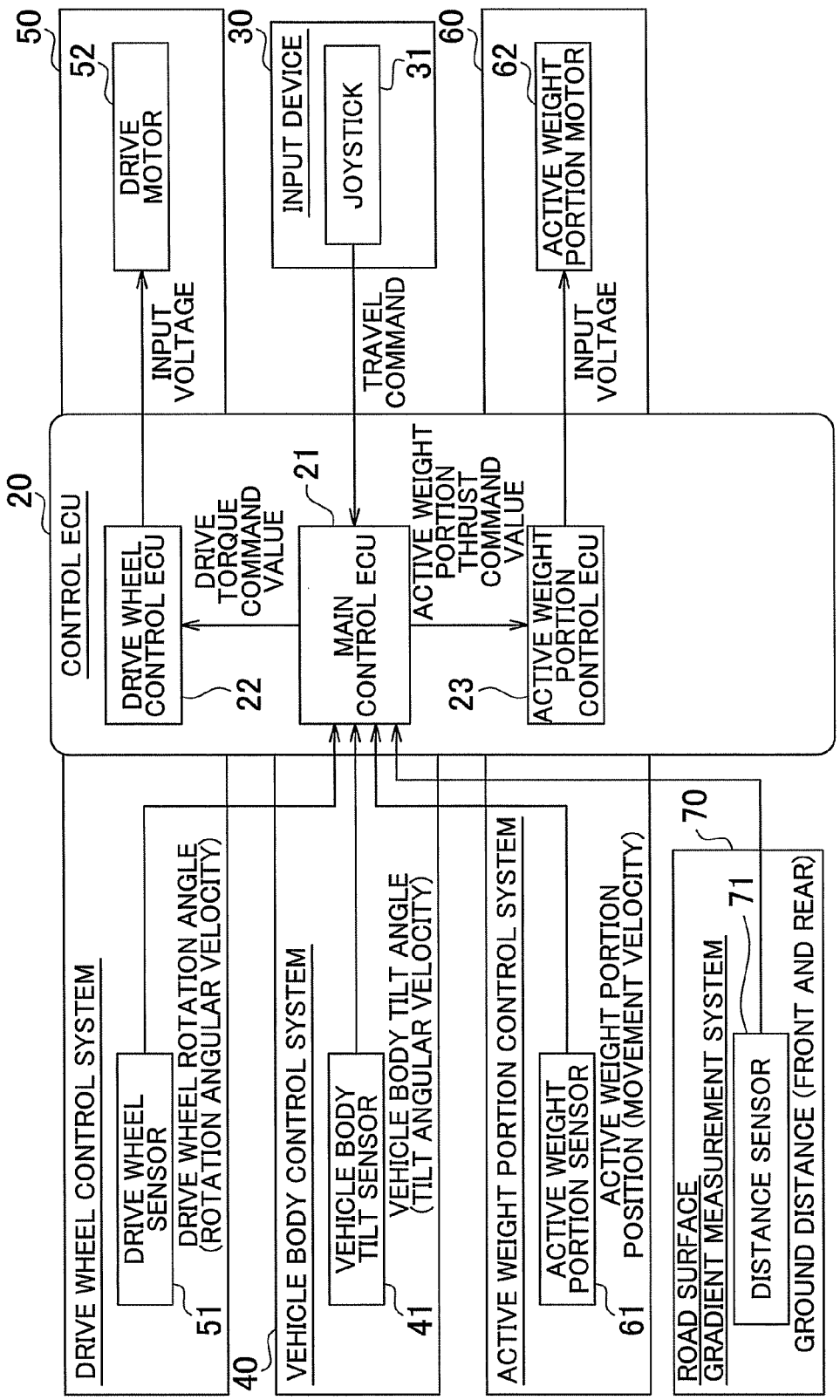

F I G . 21
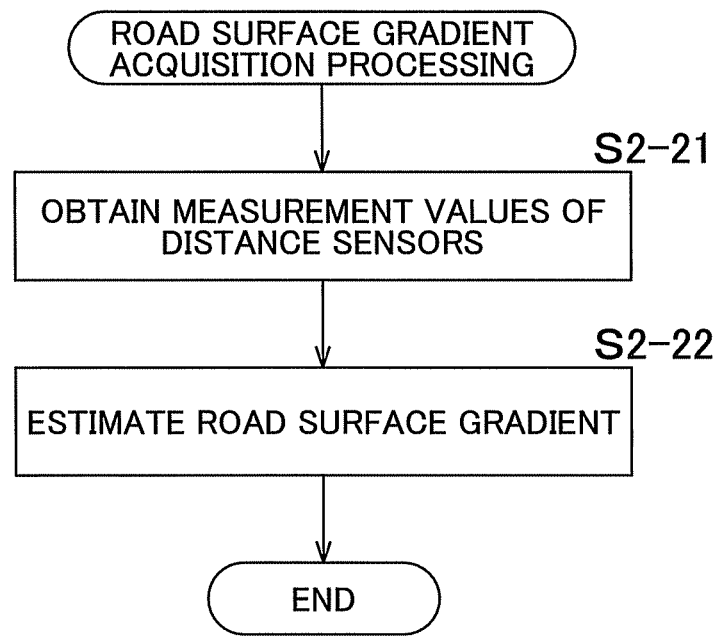

INVERTED PENDULUM VEHICLE WITH STABILITY ON A SLOPE

TECHNICAL FIELD

The present invention relates to a vehicle that employs attitude control of an inverted pendulum.

BACKGROUND ART

Techniques relating to vehicles that employ attitude control of an inverted pendulum have been proposed in the related art. Examples of these proposed techniques include a technique relating to a vehicle including two coaxially disposed drive wheels, which is driven by sensing attitude variation of a vehicle body caused by movement in the center of gravity of a driver, a technique relating to a vehicle that moves while performing attitude control using a single spherical drive wheel, and so on (see Patent Document 1, for example).

In this case, a sensor detects balance and an operational state of the vehicle body, and the vehicle is stopped or moved by controlling an operation of a rotor.

Patent Document 1: Japanese Patent Application Publication No. JP-A-2004-129435

DISCLOSURE OF THE INVENTION

Problem To Be Solved By the Invention

However, the conventional vehicles described above cannot be held in a stationary state or moved with stability on a slope. For example, to stop the vehicle on a slope, drive torque must be applied to the drive wheel to prevent the vehicle from moving in a downhill direction, but when drive torque is applied to the drive wheel, a reaction thereto acts on the vehicle body such that the vehicle body tilts in the downhill direction. On the other hand, if an attempt is made to keep the vehicle upright, drive torque cannot be applied to the drive wheel, and therefore the vehicle moves in the downhill direction.

Furthermore, when similar feedback control to feedback control performed on level ground is executed on the conventional vehicle described above on a slope, the vehicle moves slowly in the downhill direction while the vehicle body remains tilted in the downhill direction.

It is an object of the present invention to solve the problems contained in the conventional vehicles described above by providing a highly useful vehicle in which a road surface gradient is estimated taking the attitude of the vehicle body into consideration so that the road surface gradient can be estimated with a high degree of precision, whereby a stable stationary state and a stable travel state can be realized in the vehicle regardless of the road surface gradient.

Means For Solving the Problem

For this purpose, a vehicle according to the present invention includes: a drive wheel attached rotatably to a vehicle body; and a vehicle control device that controls an attitude of the vehicle body by controlling a drive torque applied to the drive wheel. In the vehicle, the vehicle control device estimates a road surface gradient on the basis of the attitude of the vehicle body, and corrects the drive torque in accordance with the road surface gradient.

In another vehicle according to the present invention, the vehicle control device estimates the road surface gradient on the basis of a state quantity of the drive wheel and the attitude of the vehicle body.

Another vehicle according to the present invention further includes an active weight portion attached movably to the vehicle body. In the vehicle, the vehicle control device controls the attitude of the vehicle body by controlling at least one of the drive torque and a position of the active weight portion, and estimates the road surface gradient taking a tilt angle of the vehicle body and the position of the active weight portion into consideration as the attitude of the vehicle body.

In another vehicle according to the present invention, the vehicle control device estimates the road surface gradient assuming that an external force that acts on the vehicle body in proportion to the road surface gradient is equal to a difference between a driving force and an inertial force of the drive wheel.

Another vehicle according to the present invention includes: a drive wheel attached rotatably to a vehicle body; an active weight portion attached movably to the vehicle body; and a vehicle control device that controls an attitude of the vehicle body by controlling at least one of a drive torque applied to the drive wheel and a position of the active weight portion. In the vehicle, the vehicle control device obtains a road surface gradient and controls the attitude of the vehicle body by moving the active weight portion in accordance with the road surface gradient.

In another vehicle according to the present invention, the vehicle control device moves the active weight portion so as to cancel out a negative torque of an uphill torque corresponding to the road surface gradient.

In another vehicle according to the present invention, the vehicle control device moves the active weight portion forward during uphill travel and moves the active weight portion backward during downhill travel.

In another vehicle according to the present invention, when movement of the active weight portion reaches a limit, the vehicle control device tilts the vehicle body.

In another vehicle according to the present invention, when a target value of the position of the active weight portion is smaller than a preset limit, the vehicle control device does not tilt the vehicle body, and when the target value reaches or exceeds the limit, the vehicle control device tilts the vehicle body.

Effects of the Invention

According to the present invetion, the attitude of the vehicle body is taken into account, and therefore the road surface gradient can be estimated accurately. Hence, a vehicle that is comfortable and safe even on a slope can be provided. Further, a device for measuring the road surface gradient is not required, and therefore the structure of the vehicle can be simplified, leading to a reduction in cost.

According to the present invetion, the tilt angle of the vehicle body, which is a parameter unique to an inverted-pendulum vehicle, is taken into account, and therefore the road surface gradient can be estimated with a high degree of precision.

According to an embodiment of the present invetion, the road surface gradient is estimated taking into account the tilt angle of the vehicle body and the position of the active weight portion as the vehicle body attitude, and therefore the road surface gradient can be estimated with an extremely high degree of precision.

According to another embodiment of the present invetion, the road surface gradient is estimated assuming that the external force acting on the vehicle body in proportion to the road surface gradient is equal to the difference between the driving force and the inertial force of the drive wheel, and therefore the road surface gradient can be estimated with a high degree of precision.

According to an embodiment of the present invetion, the active weight portion is moved in accordance with the road surface gradient, and therefore the vehicle can be maintained in a stationary state on a slope while keeping the vehicle body attitude stable. Moreover, the vehicle can travel with stability on a slope. Hence, a vehicle that is comfortable and safe even on a slope can be provided.

According to an embodiment of the present invetion, the vehicle body does not tilt forward and backward, and therefore an improvement in passenger comfort can be achieved. Further, the vehicle body is maintained in an upright state even on a slope, and therefore the field of vision of the passenger can be secured easily.

According to the present invetion, the vehicle body can be kept upright on a slope, and can therefore handle even sharp gradients.

According to the present invetion, the vehicle body does not tilt on a slope having a small gradient, and therefore an improvement in passenger comfort can be achieved.

According to the constitution of claim 9, the vehicle body can be kept upright on a slope, and can therefore handle even sharp gradients.

BRIEF DESCRIPTION OF THE DRAWINGS

FIG. 19 is a block diagram showing the constitution of a control system for the vehicle according to the third embodiment of the present invention.

FIG. 21 is a flowchart showing an operation of a road surface gradient acquisition processing according to the third embodiment of the present invention.

Figure 1:
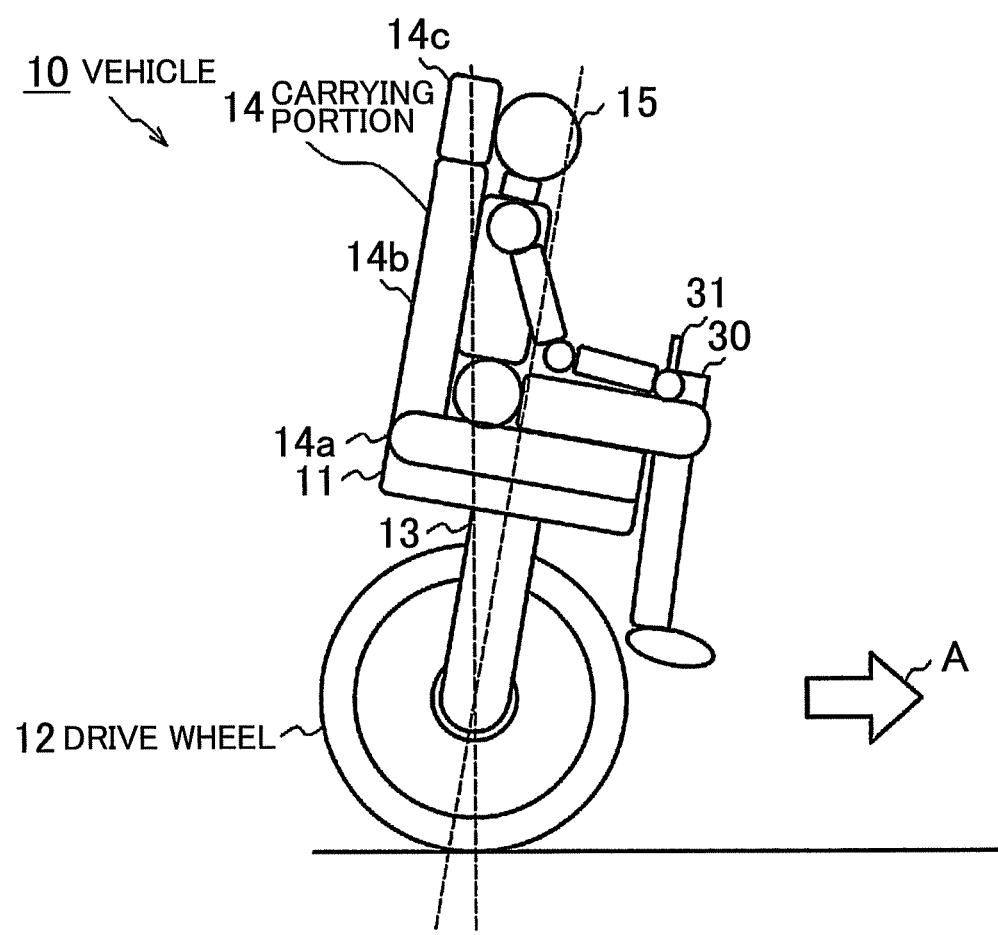
FIG. 1 is a schematic diagram showing the constitution of a vehicle according to a first embodiment of the present invention, and a view showing a state in which the vehicle accelerates forward while carrying a passenger.

DESCRIPTION OF THE REFERENCE NUMERALS 10 vehicle
12 drive wheel
14 carrying portion
20 control ECU

BEST MODES FOR CARRYING OUT THE INVENTION

Embodiments of the present invention will be described in detail below with reference to the drawings.

Figure 2:
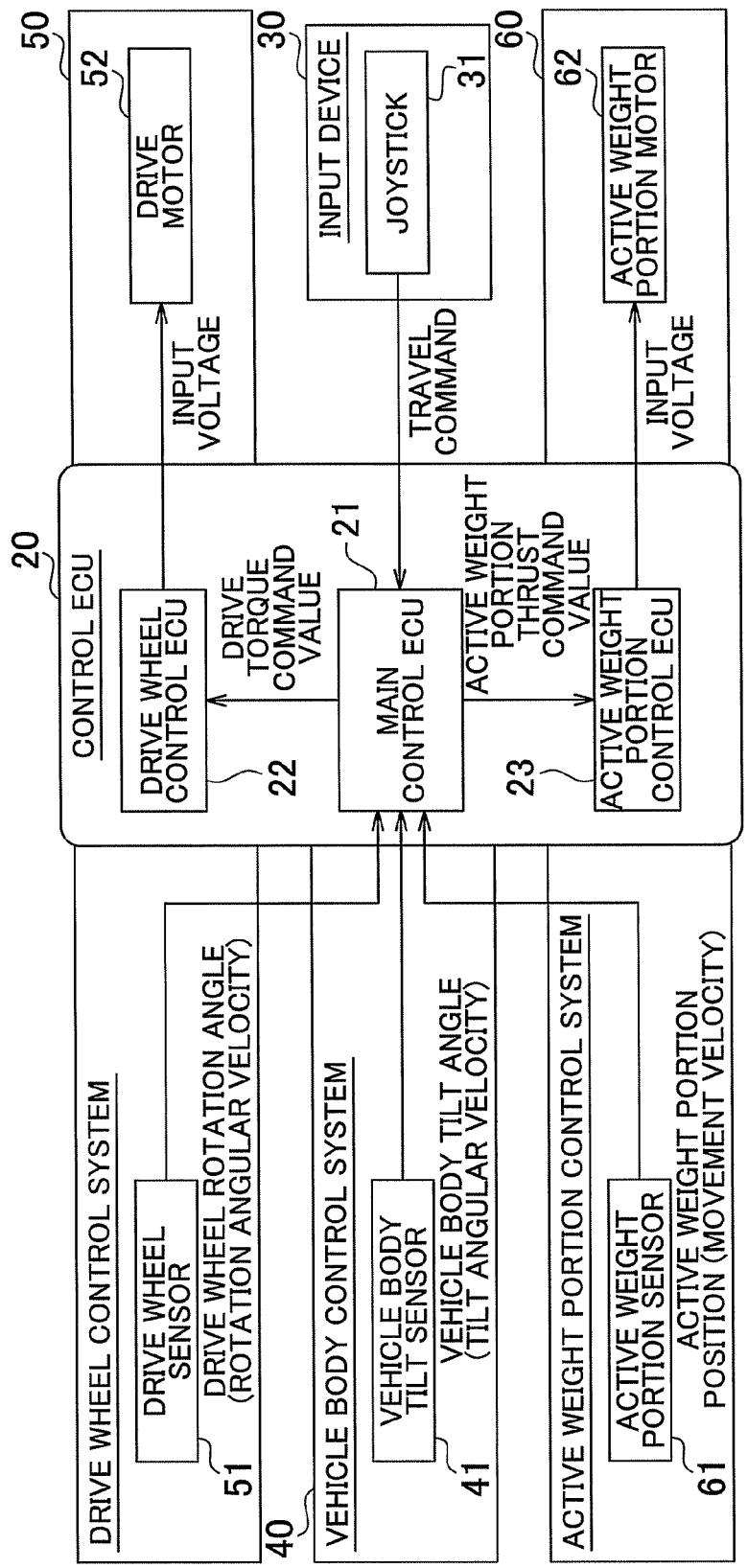
FIG. 2 is a block diagram showing the constitution of a control system for the vehicle according to the first embodiment of the present invention.

FIG. 1 is a schematic diagram showing the constitution of a vehicle according to a first embodiment of the present invention and a view showing a state in which the vehicle advances forward while carrying a passenger, and FIG. 2 is a block diagram showing the constitution of a control system for the vehicle according to the first embodiment of the present invention.

In the drawings, 10 denotes a vehicle according to this embodiment, which includes a vehicle body main body portion 11, a drive wheel 12, a support portion 13 and a carrying portion 14 for carrying a passenger 15, and in which the attitude of the vehicle body is controlled through attitude control of an inverted pendulum. The vehicle 10 is formed such that the vehicle body can be tilted forward and backward. In the example shown in FIG. 1, the vehicle 10 is accelerating in a direction indicated by an arrow A and the vehicle body is tilted forward in an advancement direction.

The drive wheel 12 is supported rotatably by the support portion 13, which forms a part of the vehicle body, and driven by a drive motor 52 serving as a drive actuator. An axis of the drive wheel 12 extends in a perpendicular direction to the paper surface of FIG. 1, and the drive wheel 12 rotates about the axis. Further, the drive wheel 12 may be provided singly or in a plurality, and when a plurality of drive wheels 12 are provided, the drive wheels 12 are arranged coaxially. In this embodiment, two drive wheels 12 are provided. In this case, the drive wheels 12 are driven independently by individual drive motors 52. A hydraulic motor and an internal combustion engine, for example, may be used as the drive actuator, but here, the drive motor 52 is constituted by an electric motor.

Further, the main body portion 11 forming a part of the vehicle body is supported from below by the support portion 13 and positioned above the drive wheels 12. The passenger portion 14, which functions as an active weight portion, is attached to the main body portion 11 to be capable of translating relative to the main body portion 11 in a front-rear direction of the vehicle 10, or in other words to be capable of relative motion in a tangential direction of a vehicle body turning circle.

Here, the active weight portion has a certain amount of weight, and translates relative to the main body portion 11, or in other words moves forward and backward, in order to correct a center of gravity position of the vehicle 10 actively. The active weight portion does not necessarily have to be the carrying portion 14, and may be a device formed by attaching a heavy peripheral machine such as a battery to the main body portion 11 translatably or a device formed by attaching a dedicated heavy member such as a weight, an anchor, or a balancer to the main body portion 11 translatably, for example. Further, the active weight portion may be constituted by a combination of the carrying portion 14, a heavy peripheral machine, a dedicated heavy member, and so on.

In this embodiment, an example in which the carrying portion 14 carrying the passenger 15 functions as the active weight portion will be described for convenience, but the carrying portion 14 does not necessarily have to be carrying the passenger 15, and when the vehicle 10 is operated by remote control, for example, the carrying portion 14 need not carry the passenger 15 and may carry goods instead of the passenger 15.

The carrying portion 14 is similar to a seat used in an automobile such as a passenger car or a bus, and includes a seat surface portion 14*a*, a backrest portion 14*b*, and a headrest 14*c*. The carrying portion 14 is attached to the main body portion 11 via a movement mechanism, not shown in the drawings.

The movement mechanism includes a low-resistance linear movement mechanism such as a linear guide device, and an active weight portion motor 62 serving as an active weight portion actuator. The movement mechanism drives the carrying portion 14 using the active weight portion motor 62 such that the carrying portion 14 moves forward and backward in the advancement direction relative to the main body portion 11. A hydraulic motor, a linear motor, and so on, for example, may be used as the active weight portion actuator, but here, the active weight portion motor 62 is constituted by a rotary electric motor.

The linear guide device includes, for example, a guide rail attached to the main body portion 11, a carriage attached to the carrying portion 14 so as to slide along the guide rail, and a rolling body such as a ball or a roller interposed between the guide rail and the carriage. Two track grooves are formed linearly in a lengthwise direction in left and right side face portions of the guide rail. Further, the carriage is formed with a C-shaped cross-section, and two track grooves are formed on the inner sides of the two opposing side face portions thereof so as to oppose the respective track grooves of the guide rail. The rolling body is inserted between the track grooves so as to roll along the track grooves in accordance with a relative linear motion between the guide rail and the carriage. The carriage is formed with a return path that connects the two ends of the track grooves so that the rolling body circulates in the track grooves and the return path.

The linear guide device further includes a brake or a clutch for fastening the movement of the linear guide device. When movement of the carrying portion 14 is not required, for example when the vehicle 10 is stationary, a relative positional relationship between the main body portion 11 and the carrying portion 14 is maintained by fixing the carriage to the guide rail using the brake. When movement is required, the brake is released and control is performed such that a distance between a reference position on the main body portion 11 side and a reference position on the carrying portion 14 side takes a predetermined value.

An input device 30 including a joystick 31 that serves as a target travel state acquisition device is disposed on the flank of the carrying portion 14. By operating the joystick 31, the passenger 15 inputs travel commands for accelerating, decelerating, and turning the vehicle 10, rotating the vehicle 10 in place, stopping and braking the vehicle 10, and so on. Note that another device, for example a device such as a jog dial, a touch panel, or buttons, may be used instead of the joystick 31 as the target travel state acquisition device as long as the device is capable of inputting travel commands when operated by the passenger 15.

When the vehicle 10 is operated by remote control, a reception device that receives a travel command from a controller either wirelessly or through a wire may be used instead of the joystick 31 as the target travel state acquisition device. Further, when the vehicle 10 travels automatically in accordance with predetermined travel command data, a data reading device that reads travel command data stored in a storage medium such as a semiconductor memory or a hard disk may be used instead of the joystick 31 as the target travel state acquisition device.

The vehicle 10 further includes a control ECU (Electronic Control Unit) 20 serving as a vehicle control device. The control ECU 20 includes a main control ECU 21, a drive wheel control ECU 22, and an active weight portion control ECU 23. The control ECU 20, together with the main control ECU 21, drive wheel control ECU 22, and active weight portion control ECU 23, constitutes a computer system that includes calculating means such as a CPU or an MPU, storage means such as a magnetic disk or a semiconductor memory, an input/output interface, and so on, and controls operations of each part of the vehicle 10. The control ECU 20 is disposed in the main body portion 11, for example, but may be disposed in the support portion 13 or the carrying portion 14. Furthermore, the main control ECU 21, drive wheel control ECU 22, and active weight portion control ECU 23 may be formed separately or integrally.

The main control ECU 21 functions as a part of a drive wheel control system 50 for controlling operations of the drive wheels 12 together with the drive wheel control ECU 22, a drive wheel sensor 51, and the drive motor 52. The drive wheel sensor 51 is constituted by a resolver, an encoder, or the like, and functions as a drive wheel rotation state measurement device for detecting a drive wheel rotation angle and/or a rotation angular velocity, indicating the rotation state of the drive wheel 12, and transmitting the detected value to the main control ECU 21. Further, the main control ECU 21 transmits a drive torque command value to the drive wheel control ECU 22, whereupon the drive wheel control ECU 22 supplies the drive motor 52 with an input voltage corresponding to the received drive torque command value. In accordance with the input voltage, the drive motor 52 applies drive torque to the drive wheel 12, thereby functioning as the drive actuator.

Further, the main control ECU 21 functions as a part of an active weight portion control system 60 for controlling operations of the carrying portion 14 serving as the active weight portion together with the active weight portion control ECU 23, an active weight portion sensor 61, and the active weight portion motor 62. The active weight portion sensor 61 is constituted by an encoder or the like, and functions as an active weight portion movement state measurement device for detecting an active weight portion position and/or a movement velocity, indicating the movement state of the carrying portion 14, and transmitting the detected value to the main control ECU 21. Further, the main control ECU 21 transmits an active weight portion thrust command value to the active weight portion control ECU 23, whereupon the active weight portion control ECU 23 supplies the active weight portion motor 62 with an input voltage corresponding to the received active weight portion thrust command value. In accordance with the input voltage, the active weight portion motor 62 applies thrust for causing the carrying portion 14 to perform a translating motion to the carrying portion 14, thereby functioning as the active weight portion actuator.

Furthermore, the main control ECU 21 functions as a part of a vehicle body control system 40 for controlling the attitude of the vehicle body together with the drive wheel control ECU 22, the active weight portion control ECU 23, a vehicle body tilt sensor 41, the drive motor 52, and the active weight portion motor 62. The vehicle body tilt sensor 41 is constituted by an acceleration sensor, a gyro sensor, or the like, and functions as a vehicle body tilt state measurement device for detecting a vehicle body tilt angle and/or a vehicle body tilt angular velocity, indicating the tilt state of the vehicle body, and transmitting the detected value to the main control ECU 21. The main control ECU 21 transmits a drive torque command value to the drive wheel control ECU 22 and transmits an active weight portion thrust command value to the active weight portion control ECU 23.

A travel command from the joystick 31 of the input device 30 is input into the main control ECU 21. The main control ECU 21 then transmits a drive torque command value to the drive wheel control ECU 22 and transmits an active weight portion thrust command value to the active weight portion control ECU 23.

Further, the control ECU 20 functions as road surface gradient estimating means for estimating a road surface gradient on the basis of temporal variation in the travel state and vehicle body attitude of the vehicle 10. The control ECU 20 also functions as target vehicle body attitude determining means for determining a target vehicle body attitude, or in other words the vehicle body tilt state and/or the active weight portion movement state, in accordance with a target travel state and the road surface gradient. The control ECU 20 also functions as actuator output determining means for determining outputs of the respective actuators in accordance with the travel state and vehicle body attitude of the vehicle 10, obtained by the respective sensors, as well as the target travel state, target vehicle body attitude, and road surface gradient. The control ECU 20 also functions as road surface gradient obtaining means for obtaining the road surface gradient in the front-rear direction of the vehicle 10. The control ECU 20 also functions as uphill torque determining means for determining the drive torque to be applied in accordance with the road surface gradient. The control ECU 20 also functions as center of gravity correction amount determining means for determining an amount by which the center of gravity of the vehicle body is to be corrected in accordance with the uphill torque.

Note that the respective sensors may obtain a plurality of state quantities. For example, an acceleration sensor and a gyro sensor may be used together as the vehicle body tilt sensor 41 such that the tilt angle and tilt angular velocity of the vehicle body are determined from measurement values of the two sensors.

Next, an operation of the vehicle 10 having the above constitution will be described. First, an outline of travel and attitude control processing will be provided.

Figure 3A:
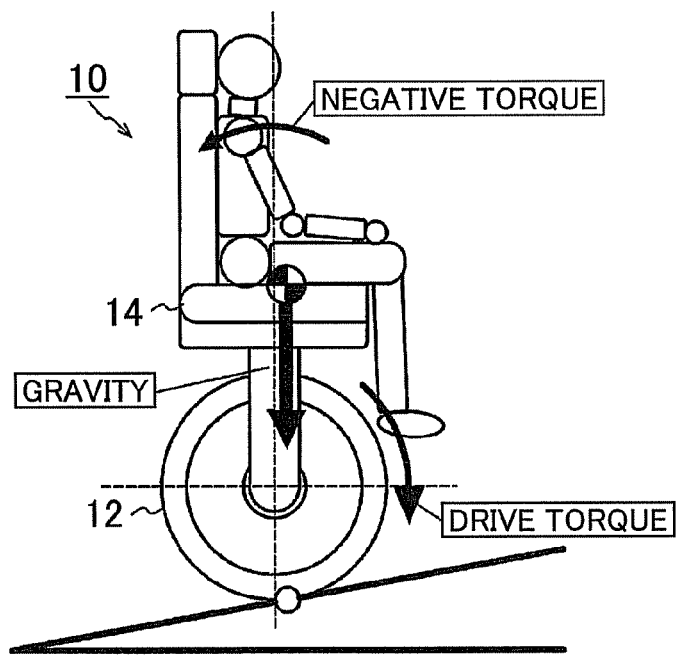
FIG. 3 is a schematic diagram showing an operation on a slope of the vehicle according to the first embodiment of the present invention.
Figure 3B:
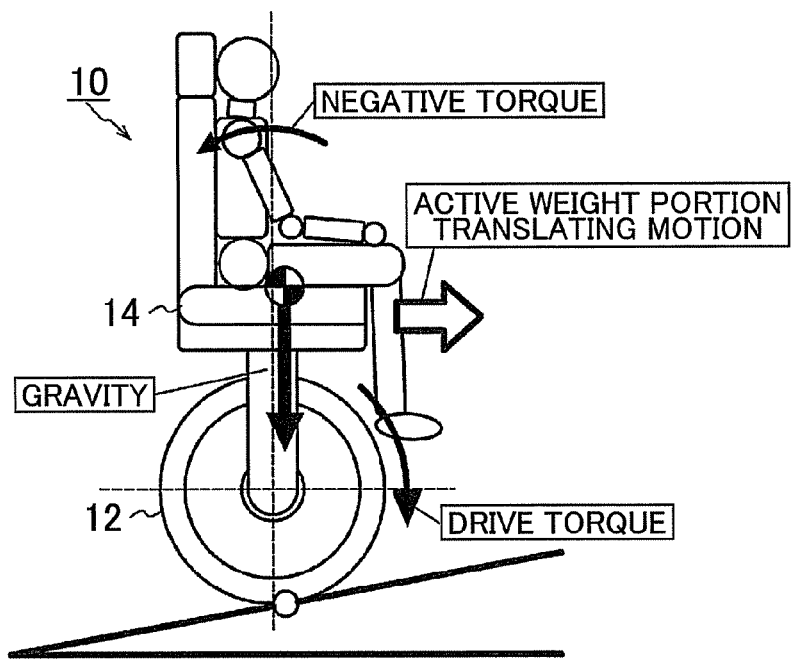
Figure 4:
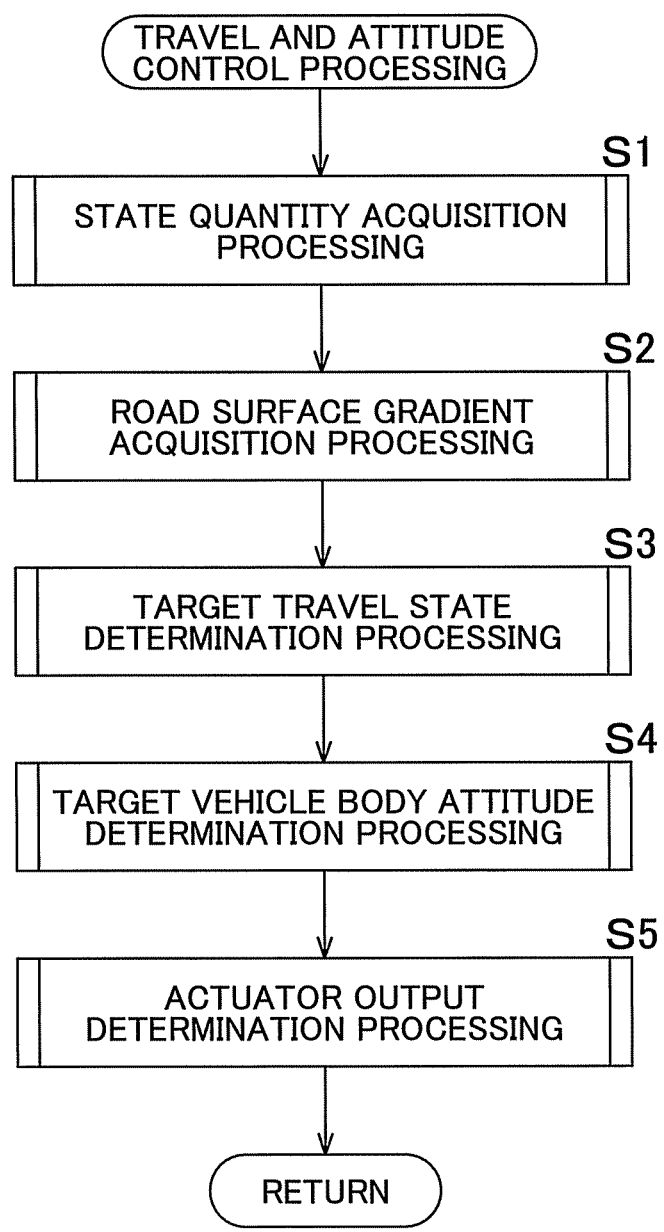
FIG. 4 is a flowchart showing an operation of a travel and attitude control processing of the vehicle according to the first embodiment of the present invention.

FIG. 3 is a schematic diagram showing an operation on a slope of the vehicle according to the first embodiment of the present invention, and FIG. 4 is an operation of a flowchart showing a travel and attitude control processing of the vehicle according to the first embodiment of the present invention. Note that FIG. 3A shows an example of an operation according to the related art for comparison, while FIG. 3B shows an operation according to this embodiment.

In this embodiment, the carrying portion 14 functions as the active weight portion which actively corrects the center of gravity position of the vehicle 10 through translation, or in other words by moving forward and backward, as shown in FIG. 3B. Thus, when the vehicle 10 is stopped on a slope, the vehicle body does not tilt in a downhill direction even if a reaction to drive torque that is applied to the drive wheels 12 to prevent the vehicle 10 from moving in the downhill direction, or in other words negative torque, acts on the vehicle body. Furthermore, the vehicle body does not tilt in the downhill direction during travel on a slope, and therefore the vehicle 10 can travel with stability.

On the other hand, when the center of gravity position is not corrected in accordance with the road surface gradient, as in the conventional vehicle described in the "Background Art" section and as shown in FIG. 3A, the reaction to the drive torque applied to the drive wheels 12 to stop the vehicle 10 on a slope, or in other words negative torque, acts on the vehicle body such that the vehicle body tilts in the downhill direction. Furthermore, during travel on a slope, vehicle body attitude control and travel control cannot be performed with stability.

In this embodiment, travel and attitude control processing is executed, and therefore the vehicle 10 can be stopped and moved with stability regardless of the road surface gradient.

In the travel and attitude control processing, first, the control ECU 20 executes state quantity acquisition processing (step S1) in which the rotation state of the drive wheels 12, the tilt state of the vehicle body, and the movement state of the carrying portion 14 are obtained by the respective sensors, i.e. the drive wheel sensor 51, the vehicle body tilt sensor 41, and the active weight portion sensor 61.

Next, the control ECU 20 executes road surface gradient acquisition processing (step S2) in which the road surface gradient is estimated by an observer on the basis of the state quantities obtained in the state quantity acquisition processing, i.e. the rotation state of the drive wheels 12, the tilt state of the vehicle body, and the movement state of the carrying portion 14, and output values of the respective actuators, i.e. the output values of the drive motor 52 and the active weight portion motor 62. Here, the observer is a method and a state observer for observing an internal state of a control system on the basis of a dynamic model, and is constituted by wired logic or soft logic.

Next, the control ECU 20 executes target travel state determination processing (step S3) in which a target value of the acceleration of the vehicle 10 and a target value of the rotation angular velocity of the drive wheel 12 are determined on the basis of an operation amount of the joystick 31.

Next, the control ECU 20 executes target vehicle body attitude determination processing (step S4) in which a target value of the vehicle body attitude, or in other words target values of the vehicle body tilt angle and the active weight portion position, is determined on the basis of the road surface gradient obtained in the road surface gradient acquisition processing and the target acceleration value of the vehicle 10 determined in the target travel state determination processing.

Finally, the control ECU 20 executes actuator output determination processing (step S5) in which the outputs of the respective actuators, or in other words the outputs of the drive motor 52 and the active weight portion motor 62, are determined on the basis of the respective state quantities obtained in the state quantity acquisition processing, the road surface gradient obtained in the road surface gradient acquisition processing, the target travel state determined in the target travel state determination processing, and the target vehicle body attitude determined in the target vehicle body attitude determination processing.

Next, the travel and attitude control processing will be described in detail. First, the state quantity acquisition processing will be described.

Figure 5:
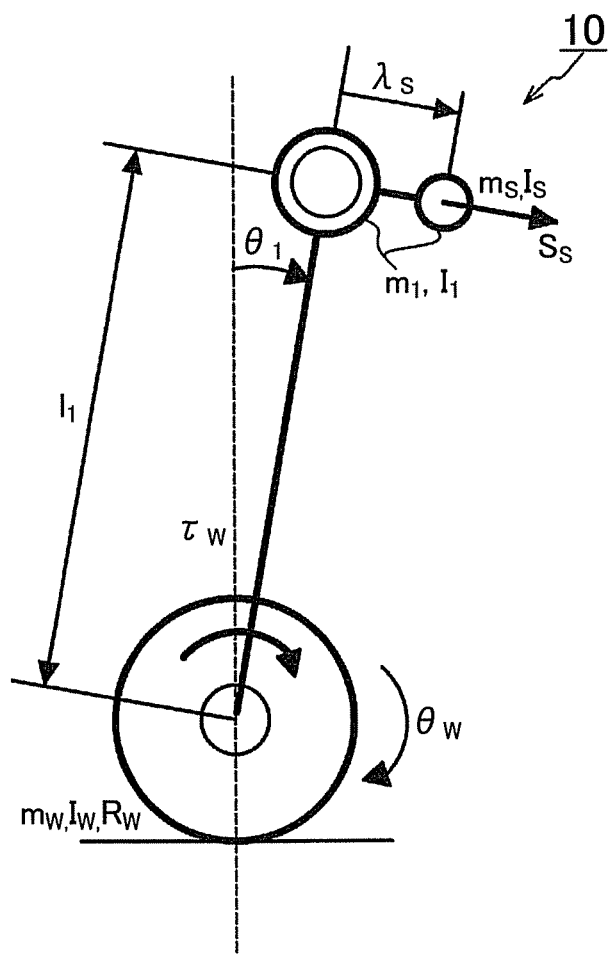
FIG. 5 is a view showing a dynamic model of the vehicle according to the first embodiment of the present invention.
Figure 6:
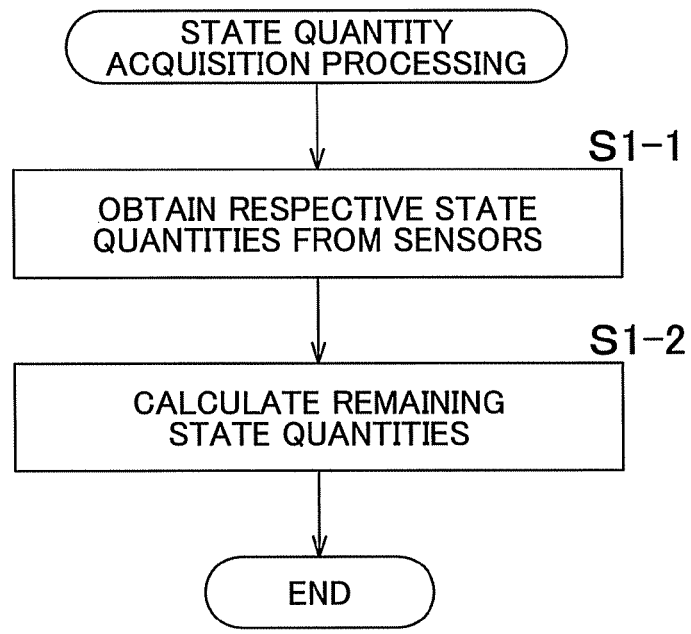
FIG. 6 is a flowchart showing an operation of a state quantity acquisition processing according to the first embodiment of the present invention.

FIG. 5 is a view showing a dynamic model of the vehicle according to the first embodiment of the present invention and parameters thereof, and FIG. 6 is a flowchart showing an operation of a state quantity acquisition processing according to the first embodiment of the present invention.

In this embodiment, state quantities and parameters are represented by the following symbols. Note that FIG. 5 shows a part of the state quantities and parameters.

$\theta_w$: drive wheel rotation angle [rad]
$\theta_1$: vehicle body tilt angle (vertical axis reference) [rad]
$\lambda_s$: active weight portion position (vehicle body center point reference) [m]
$\tau_w$: drive torque (sum total of two drive wheels) [Nm]
$S_s$: active weight portion thrust [N]
g: gravitational acceleration [m/s$^2$]
$\eta$: road surface gradient [rad]
$m_w$: drive wheel mass (sum total of two drive wheels) [kg]
$R_w$: drive wheel ground contact radius [m]
$I_w$: drive wheel inertial moment (sum total of two drive wheels) [kgm$^2$]
$D_w$: viscous damping coefficient relative to drive wheel rotation [Nms/rad]
$m_1$: vehicle body mass (including active weight portion) [kg]
$l_1$: vehicle body center of gravity distance (from axle) [m]
$I_1$: vehicle body inertial moment (about center of gravity) [kgm$^2$]
$D_1$: viscous damping coefficient relative to vehicle body tilt [Nms/rad]
$m_s$: active weight portion mass [kg]
$l_s$: active weight portion center of gravity distance (from axle) [m]
$I_s$: active weight portion inertial moment (about center of gravity) [kgm$^2$]
$D_s$: viscous damping coefficient relative to active weight portion translation [Nms/rad]

In the state quantity acquisition processing, first, the main control ECU 21 obtains the respective state quantities from the sensors (step S1-1). In this case, the drive wheel rotation angle $\theta_w$ and/or the rotation angular velocity $\dot{\theta}_W$ are obtained from the drive wheel sensor 51, the vehicle body tilt angle $\theta_1$ and/or the tilt angular velocity $\dot{\theta}_1$ are obtained from the vehicle body tilt sensor 41, and the active weight portion position $\lambda_s$ and/or the movement velocity $\dot{\lambda}_S$ are obtained from the active weight portion sensor 61.

Next, the main control ECU 21 calculates the remaining state quantities (step S1-2). In this case, the remaining state quantities are calculated by subjecting the obtained state quantities to temporal differentiation or temporal integration. For example, when the obtained state quantities are the drive wheel rotation angle $\theta_w$, the vehicle body tilt angle $\theta_1$, and the active weight portion position $\lambda_s$, the rotation angular velocity $\dot{\theta}_W$, the tilt angular velocity $\dot{\theta}_1$, and the movement velocity $\dot{\lambda}_S$ can be obtained by subjecting the obtained state quantities to temporal differentiation. Further, when the obtained state quantities are the rotation angular velocity $\dot{\theta}_W$, the tilt angular velocity $\dot{\theta}_1$, and the movement velocity $\dot{\lambda}_S$, for example, the drive wheel rotation angle $\theta_w$, the vehicle body tilt angle $\theta_1$, and the active weight portion position $\lambda_s$ can be obtained by subjecting the obtained state quantities to temporal integration.

Next, the road surface gradient acquisition processing will be described.

Figure 7:
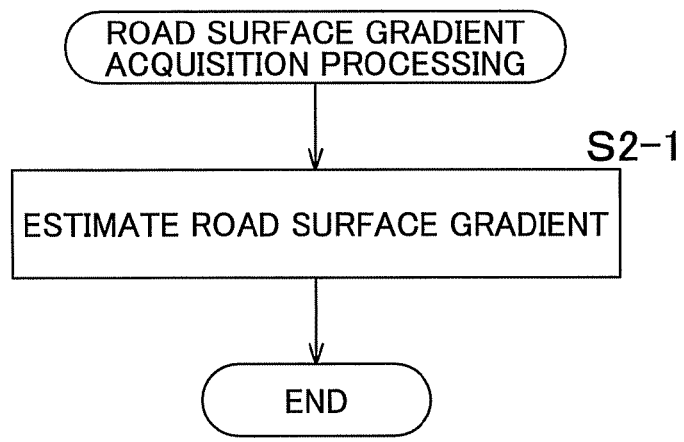
FIG. 7 is a flowchart showing an operation of a road surface gradient acquisition processing according to the first embodiment of the present invention.

FIG. 7 is a flowchart showing an operation of a road surface gradient acquisition processing according to the first embodiment of the present invention.

In the road surface gradient acquisition processing, the main control ECU 21 estimates the road surface gradient $\eta$ (step S2-1). In this case, the road surface gradient $\eta$ is estimated using a following Equation (1) on the basis of the respective state quantities obtained in the state quantity acquisition processing and the outputs of the respective actuators determined in the actuator output determination processing of the previous (one step previous) travel and attitude control processing.

[Numeral 1]

$$\eta = \frac{1}{Mg}\left\{\frac{\tau_W}{R_W} - (\tilde{M} R_W \ddot{\theta}_W + m_1 l_1 \ddot{\theta}_1 + m_s \ddot{\lambda}_S)\right\} \qquad \text{Equation 1}$$

Here, $$M = m_1 + m_W, \quad \tilde{M} = M + \frac{I_W}{R_W^2}$$

are established.

Further, the acceleration values $\ddot{\theta}_W$, $\ddot{\theta}_1$, $\ddot{\lambda}_S$ are determined by subjecting the rotation angular velocity $\dot{\theta}_W$, the tilt angular velocity $\dot{\theta}_1$, and the movement velocity $\dot{\lambda}_S$ to time differentiation.

Note that in Equation (1), a value obtained by multiplying the left side by the right side denominator, or in other words Mg$\eta$, represents external force.

Further, $$\frac{\tau_W}{R_W}$$

represents driving force, while ($\tilde{M} R_W \ddot{\theta}_W + m_1 \lambda_1 \ddot{\theta}_1 + m_s \ddot{\lambda}_S$) represents inertial force.

Furthermore, $\tilde{M} R_W \ddot{\theta}_W$ represents drive wheel translation inertial force, $m_1 \lambda_1 \ddot{\theta}_1$ represents vehicle body tilt inertial force, and $m_s \ddot{\lambda}_S$ represents active weight portion movement inertial force.

Hence, in this embodiment, the road surface gradient is estimated on the basis of the drive torque output by the drive motor 52, and the drive wheel rotation angular acceleration, vehicle body tilt angular acceleration, and active weight portion movement acceleration serving as state quantities. In this case, the vehicle body tilt angular acceleration and the active weight portion movement acceleration, which indicate attitude variation of the vehicle body, are taken into consideration in addition to the drive wheel rotation angular acceleration indicating the rotation state of the drive wheels 12. In other words, the vehicle body attitude, which is a unique element of a so-called inverted-pendulum vehicle that employs attitude control of an inverted pendulum, is taken into account.

In the related art, the road surface gradient is estimated on the basis of the drive torque and the drive wheel rotation angular acceleration, and therefore, particularly when the attitude of the vehicle body varies, a large error occurs in the estimated value of the road surface gradient. In this embodiment, however, the road surface gradient is estimated taking into account the vehicle body tilt angular acceleration and the active weight portion movement acceleration, which indicate variation in the attitude of the vehicle body, and therefore a large error does not occur. As a result, the road surface gradient can be estimated with an extremely high degree of precision.

In a typical inverted-pendulum vehicle, the center of gravity of the vehicle body moves forward and backward relative to the drive wheel, and therefore the center of gravity of the vehicle may move forward or backward even when the drive wheel is stationary. Therefore, the effect of such movement must also be taken into account in order to estimate the road surface gradient with a high degree of precision from the center of gravity acceleration and the driving force or drive torque. In a typical inverted-pendulum vehicle, a weight ratio of the vehicle body relative to the entire vehicle is high, and therefore the effect of the relative movement of the vehicle body is particularly large when the vehicle is stationary.

Note that by applying a low pass filter to the estimated value of the road surface gradient, a high frequency component of the estimated value can be removed. In this case, a time lag occurs in the estimation, but oscillation caused by the high frequency component can be suppressed.

In this embodiment, external force generated by the driving force, the inertial force and the road surface gradient is taken into account. However, rolling resistance of the drive wheels 12, viscous resistance caused by friction in the rotary shaft, air resistance acting on the vehicle 10, and so on may also be taken into account as secondary effects.

Further, in this embodiment, a linear model relating to the rotary motion of the drive wheels 12 is used, but a more accurate non-linear model or a model relating to the tilting motion of the vehicle body and the translating motion of the active weight portion may be used instead. Note that the non-linear model may be provided in a map format to which a function is applied.

Moreover, variation in the attitude of the vehicle body need not be taken into account in order to simplify calculation.

Next, the target travel state determination processing will be described.

Figure 8:
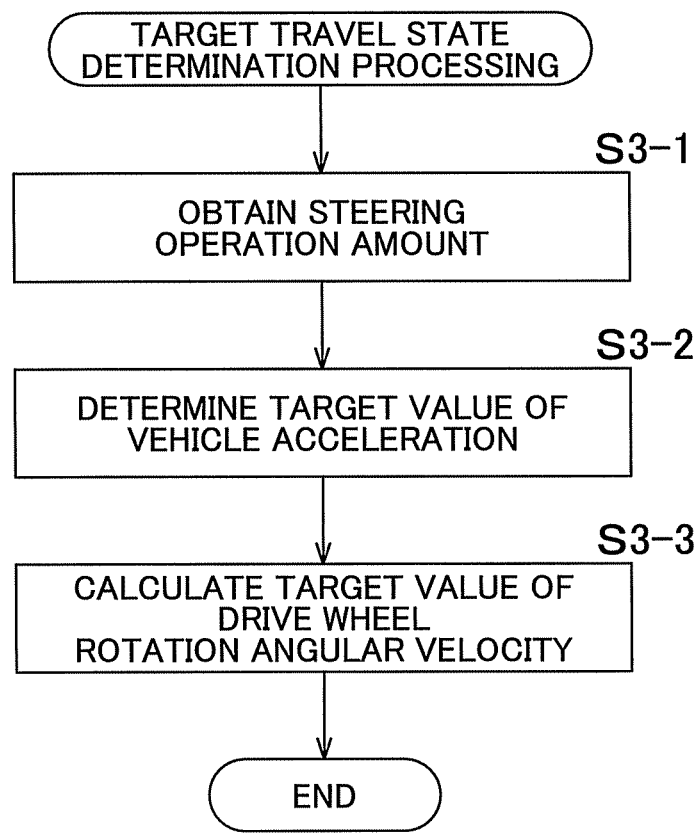
FIG. 8 is a flowchart showing an operation of a target travel state determination processing according to the first embodiment of the present invention.

FIG. 8 is a flowchart showing an operation of a target travel state determination processing according to the first embodiment of the present invention.

In the target travel state determination processing, first, the main control ECU 21 obtains a steering operation amount (step S3-1). In this case, the main control ECU 21 obtains an amount by which the passenger 15 operates the joystick 31 to input a travel command for accelerating, decelerating, or turning the vehicle 10, rotating the vehicle 10 in place, stopping or braking the vehicle 10, and so on.

Next, the main control ECU 21 determines a target value of the vehicle acceleration on the basis of the obtained operation amount of the joystick 31 (step S3-2). For example, a value which is proportionate to the operation amount of the joystick 31 in a front-rear direction is set as the target value of the vehicle acceleration.

Next, the main control ECU 21 calculates a target value of the drive wheel rotation angular velocity from the determined target value of the vehicle acceleration (step S3-3). For example, the target acceleration value is temporally integrated and a value obtained by dividing the temporally integrated target acceleration value by the drive wheel ground contact radius $R_W$ is set as the target value of the drive wheel rotation angular velocity.

Next, the target vehicle body attitude determination processing will be described.

Figure 9:
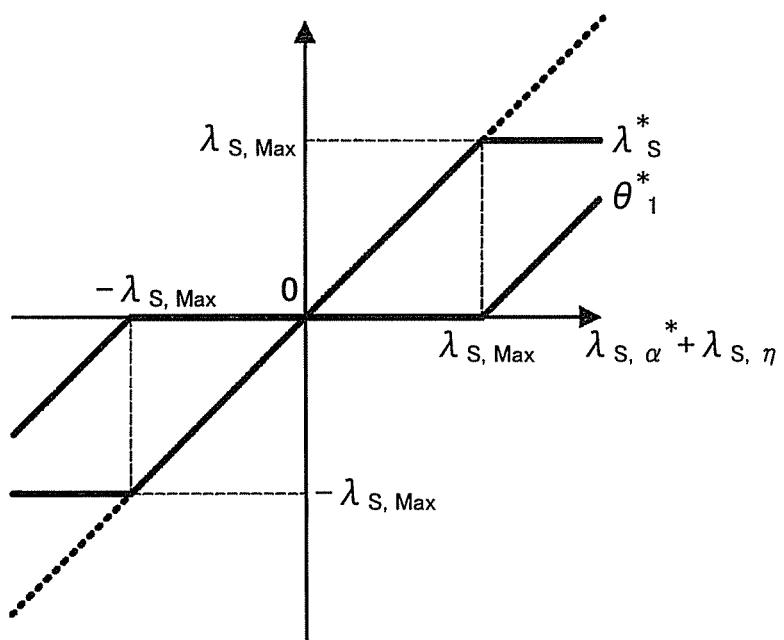
FIG. 9 is a graph showing variation in a target value of an active weight portion position and a target value of a vehicle body tilt angle according to the first embodiment of the present invention.
Figure 10:
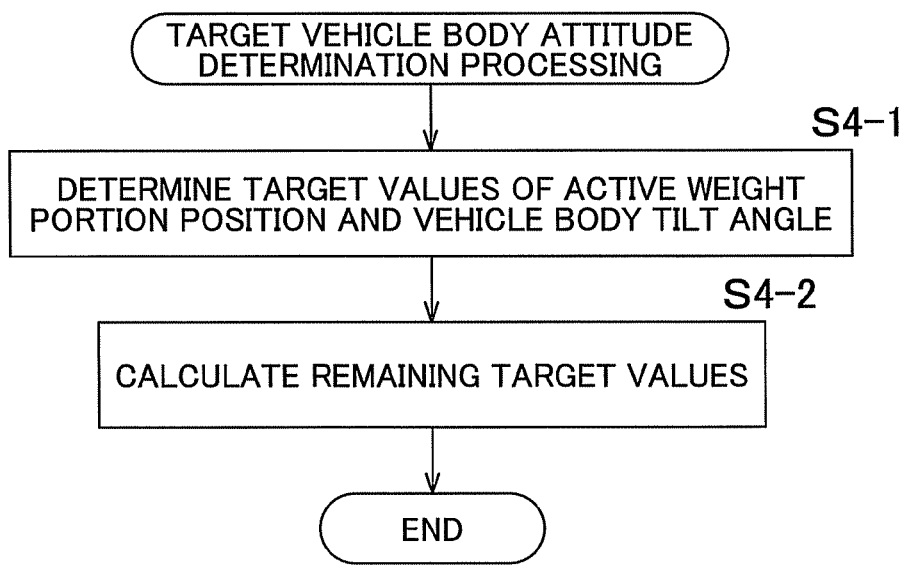
FIG. 10 is a flowchart showing an operation of a target vehicle body attitude determination processing according to the first embodiment of the present invention.

FIG. 9 is a graph showing variation in a target value of an active weight portion position and a target value of a vehicle body tilt angle according to the first embodiment of the present invention, and FIG. 10 is an operation of a flowchart showing a target vehicle body attitude determination processing according to the first embodiment of the present invention.

In the target vehicle body attitude determination processing, first, the main control ECU 21 determines a target value of the active weight portion position and a target value of the vehicle body tilt angle (step S4-1). In this case, the target value of the active weight portion position and the target value of the vehicle body tilt angle are determined using following Equations (2) and (3) on the basis of the target value of the vehicle acceleration determined in the target travel state determination processing and the road surface gradient $\eta$ obtained in the road surface gradient acquisition processing.

[Numeral 2]

When the target value of the vehicle acceleration is set as $\alpha^*$ [G], a target value $\lambda_s^*$ of the active weight portion position is expressed by the following Equation (2).

$$\lambda_S^* = \begin{cases} -\lambda_{S,Max} & (\lambda_{S,\alpha}^* + \lambda_{S,\eta} \leq \lambda_{S,Max}) \\ \lambda_{S,\alpha}^* + \lambda_{S,\eta} & (-\lambda_{S,Max} < \lambda_{S,\alpha}^* + \lambda_{S,\eta} < \lambda_{S,Max}) \\ \lambda_{S,Max} & (\lambda_{S,\alpha}^* + \lambda_{S,\eta} \geq \lambda_{S,Max}) \end{cases} \quad \text{Equation 2}$$

Here, $$\lambda_{S,\alpha}^* = \frac{m_1 \ell_1 + \tilde{M} R_W}{m_S} \alpha^*, \quad \lambda_{S,\eta} = \frac{M R_W}{m_S} \eta$$

are established.

Further, $\lambda_{S,Max}$ is an active weight portion movement limit, which is set in advance in accordance with the structure of the movement mechanism for moving the carrying portion 14 serving as the active weight portion and so on.

Moreover, $\lambda_{S,\alpha}^*$ is a required active weight portion movement amount for balancing the vehicle body relative to the inertial force and drive motor negative torque that accompany vehicle acceleration, or in other words a movement amount for canceling out the effect of acceleration/deceleration of the vehicle 10.

On the other hand, $\lambda_{S,\eta}$ is a required active weight portion movement amount for balancing the vehicle body relative to negative torque of uphill torque corresponding to the road surface gradient 11, or in other words a movement amount for canceling out the effect of the road surface gradient $\eta$.

[Numeral 3]

A target value $\theta^*_1$ of the vehicle body tilt angle is expressed by the following Equation (3).

$$\theta^*_1 = \begin{cases} \theta^*_{1,\alpha} + \theta_{1,\eta} + \theta_{S,Max} & (\lambda^*_{S,\alpha} + \lambda_{S,\eta} \leq -\lambda_{S,Max}) \\ 0 & (-\lambda_{S,Max} < \lambda^*_{S,\alpha} + \lambda_{S,\eta} < \lambda_{S,Max}) \\ \theta^*_{1,\alpha} + \theta_{1,\eta} - \theta_{S,Max} & (\lambda^*_{S,\alpha} + \lambda_{S,\eta} \geq \lambda_{S,Max}) \end{cases} \quad \text{Equation 3}$$

Here, $$\theta^*_{1,\alpha} = \frac{m_1 \ell_1 + \tilde{M} R_W}{m_1 \ell_1} \alpha^*, \quad \theta_{1,\eta} = \frac{M R_W}{m_1 \ell_1} \eta, \quad \theta_{S,Max} = \frac{m_S \lambda_{S,Max}}{m_1 \ell_1}$$

are established.

$\theta_{S,Max}$ is a value obtained by converting an effect obtained by moving the carrying portion 14 serving as the active weight portion to the active weight portion movement limit $\lambda_{S,Max}$ into a vehicle body tilt angle, and corresponds to a part following subtraction of the movement amount of the carrying portion 14.

Further, $\theta_{1,\alpha}^*$ is a required vehicle body tilt angle for balancing the vehicle body relative to the inertial force and drive motor negative torque that accompany vehicle acceleration, or in other words a tilt angle for canceling out the effect of acceleration/deceleration of the vehicle 10.

On the other hand, $\theta_{1,\eta}$ is a required vehicle body tilt angle for balancing the vehicle body relative to negative torque of uphill torque corresponding to the road surface gradient or in other words a tilt angle for canceling out the effect of the road surface gradient $\eta$.

Next, the main control ECU 21 calculates the remaining target values (step S4-2). In other words, the main control ECU 21 calculates the target values of the drive wheel rotation angle, the vehicle body tilt angular velocity, and the movement velocity of the active weight portion by temporally differentiating or temporally integrating the respective target values.

Hence, in this embodiment, the target value of the vehicle body attitude, or in other words the target value of the active weight portion position and the target value of the vehicle body tilt angle, is determined taking into account not only the inertial force and drive motor negative torque that act on the vehicle body as the vehicle 10 accelerates, but also the negative torque that acts on the vehicle body in accordance with the uphill torque corresponding to the road surface gradient $\eta$.

At this time, the center of gravity of the vehicle body is moved such that torque which acts on the vehicle body in an attempt to tilt the vehicle body, or in other words vehicle body tilt torque, is canceled out by the action of gravity. For example, when the vehicle 10 accelerates or travels uphill, the carrying portion 14 is moved forward or the vehicle body is tilted further forward. Further, when the vehicle 10 decelerates or travels downhill, the carrying portion 14 is moved backward or the vehicle body is tilted further backward.

In this embodiment, as shown in FIG. 9, the carrying portion 14 is initially moved without tilting the vehicle body, and when the carrying portion 14 reaches the active weight portion movement limit, tilting of the vehicle body begins. Thus, the vehicle body is not tilted forward and backward in response to small acceleration/deceleration, and therefore the comfort of the passenger 15 is improved. Further, unless the gradient is particularly steep, the vehicle body is maintained in an upright state even on a slope, and therefore the field of vision of the passenger 15 can be secured easily. Moreover, unless the gradient is particularly steep, the vehicle body is not tilted greatly even on a slope, and therefore a situation in which a part of the vehicle body impinges on the road surface can be prevented.

Note that in this embodiment, a case in which the forward and backward active weight portion movement limits are equal is envisaged, but when the forward and backward limits are different, vehicle body tilting can be switched in accordance with the respective limits. For example, in a case where braking performance is set to be greater than acceleration performance, the backward active weight portion movement limit must be set farther than the forward limit.

Further, in this embodiment, when the acceleration is small or the gradient is gentle, the carrying portion 14 is simply moved. However, the vehicle body tilt torque generated at that time may be dealt with partially or wholly by tilting the vehicle body. By tilting the vehicle body, the force that acts on the passenger 15 in the front-rear direction can be reduced.

Furthermore, in this embodiment, equations based on a linearized dynamic model are used, but equations based on a more accurate non-linear model or a model that takes viscous resistance into account may be used instead. Note that when the equations are non-linear, the equations may be provided in a map format to which a function is applied.

Next, the actuator output determination processing will be described.

Figure 11:
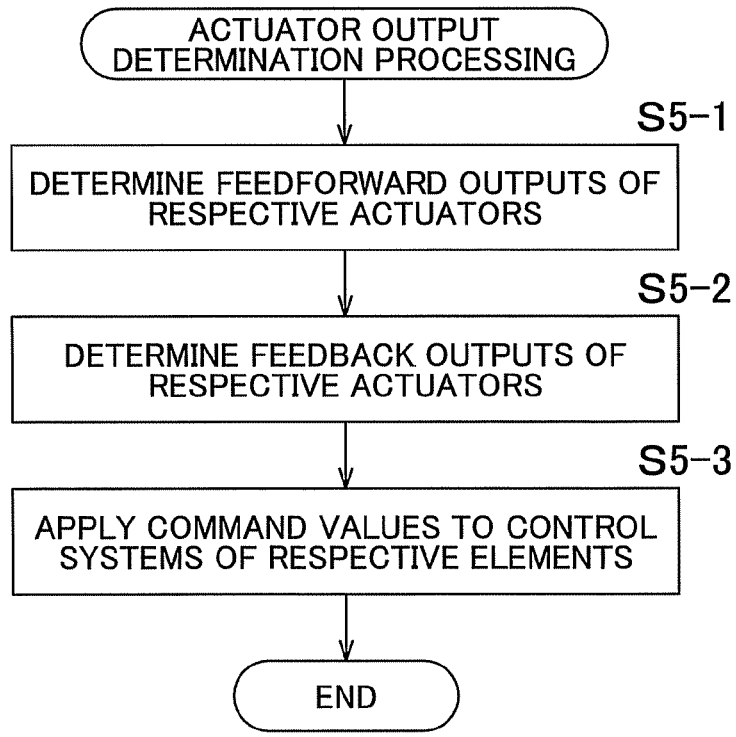
FIG. 11 is a flowchart showing an operation of an actuator output determination processing according to the first embodiment of the present invention.

FIG. 11 is an operation of a flowchart showing an actuator output determination processing according to the first embodiment of the present invention.

In the actuator output determination processing, first, the main control ECU 21 determines feedforward outputs of the respective actuators (step S5-1). In this case, a feedforward output of the drive motor 52 and a feedforward output of the active weight portion motor 62 are determined from the respective target values and the road surface gradient $\eta$ using a following Equation (4) and a following Equation (5), respectively.

[Numeral 4]

A feedforward output $\tau_{W,F,F}$ of the drive motor 52 is expressed by the following Equation (4).

$$\tau_{W,FF} = \tilde{M} R_W g \alpha^* + M R_W g \eta \quad \text{Equation 4}$$

$\tilde{M} R_W g \alpha^*$ denotes a drive torque required to realize a target value $\alpha^*$ of the vehicle acceleration, and $M R_W g \eta$ denotes a drive torque for stopping the vehicle on a slope having the road surface gradient $\eta$, or in other words the uphill torque.

By adding the uphill torque corresponding to the road surface gradient $\eta$ automatically in this manner, or in other words by correcting the drive torque in accordance with the road surface gradient $\eta$, a similar steering feeling to that obtained on level ground can be provided on a slope. In other words, the vehicle 10 does not move even when the passenger 15 releases the joystick 31 after stopping on a slope. Furthermore, similar acceleration/deceleration to that obtained on level ground can be achieved in relation to an identical steering operation of the joystick 31 performed on a slope.

[Numeral 5]

A feedforward output $S_{S,F,F}$ of the active weight portion motor 62 is expressed by the following Equation (5).

$$S_{S,FF} = m_S g \theta^*_1 + m_S g \alpha^* \quad \text{Equation 5}$$

$m_S g \theta_1^*$ denotes a carrying portion thrust required to retain the carrying portion 14 in a target position relative to the target value $\theta_1^*$ of the vehicle body tilt angle, and $m_s g\alpha^*$ denotes a carrying portion thrust required to retain the carrying portion 14 in position relative to the inertial force that accompanies the target value $\alpha^*$ of the vehicle acceleration.

Hence, in this embodiment, by applying a feedforward output logically, more precise control is realized.

Note that if necessary, the feedforward output can be omitted. In this case, a value approximating the feedforward output is applied indirectly together with a steady-state deviation through feedback control. Further, the steady-state deviation may be reduced by applying an integral gain.

Next, the main control ECU 21 determines feedback outputs of the respective actuators (step S5-2). In this case, a feedback output of the drive motor 52 and a feedback output of the active weight portion motor 62 are determined from a deviation between each target value and the corresponding actual state quantity using a following Equation (6) and a following Equation (7), respectively.

[Numeral 6]

A feedback output $\tau_{W,F,B}$ of the drive motor 52 is expressed by the following Equation (6).

$$\tau_{W,FB} = -K_{W1}(\theta_W - \theta_W^*) - K_{W2}(\dot{\theta}_W - \dot{\theta}_W^*) - K_{W3}(\theta_1 - \theta_1^*) - \quad \text{Equation 6}$$
$$K_{W4}(\dot{\theta}_1 - \dot{\theta}_1^*) - K_{W5}(\lambda_S - \lambda_S^*) - K_{W6}(\dot{\lambda}_S - \dot{\lambda}_S^*)$$

Here, $K_{W1}$ to $K_{W6}$ are feedback gains, the values of which are set in advance as the value of an optimum regulator, for example. Note that * denotes a target value.

Further, a feedback output $S_{S,F,B}$ of the active weight portion motor 62 is expressed by the following Equation (7).

$$S_{S,FB} = -K_{S1}(\theta_W - \theta_W^*) - K_{S2}(\dot{\theta}_W - \dot{\theta}_W^*) - K_{S3}(\theta_1 - \theta_1^*) - \quad \text{Equation 7}$$
$$K_{S4}(\dot{\theta}_1 - \dot{\theta}_1^*) - K_{S5}(\lambda_S - \lambda_S^*) - K_{S6}(\dot{\lambda}_S - \dot{\lambda}_S^*)$$

Here, $K_{S1}$ to $K_{S6}$ are feedback gains, the values of which are set in advance as the value of an optimum regulator, for example. Note that * denotes a target value.

Note that non-linear feedback control such as sliding mode control may also be introduced. Furthermore, to simplify the control, some of the feedback gains, excluding $K_{W2}$, $K_{W3}$ and $K_{S5}$, may be set at zero. Moreover, an integral gain may be introduced to eliminate the steady-state deviation.

Finally, the main control ECU 21 applies a command value to the control systems of the respective elements (step S5-3). In this case, the main control ECU 21 transmits the sum of the feedforward outputs and feedback outputs determined in the manner described above to the drive wheel control ECU 22 and active weight portion control ECU 23 as a drive torque command value and an active weight portion thrust command value.

Hence, in this embodiment, the carrying portion 14 is moved upward after estimating the road surface gradient $\eta$ using an observer and applying the uphill torque. As a result, the vehicle body can be held upright on a slope and can also handle sharp gradients. Moreover, since a device for measuring the road surface gradient $\eta$ is not required, structural simplification and a corresponding reduction in cost can be achieved.

Further, the road surface gradient is estimated taking into account the vehicle body tilt angle $\theta_1$ and active weight portion position $\lambda_S$, which indicate the attitude of the vehicle body, and therefore the road surface gradient $\eta$ can be estimated with an extremely high degree of precision without large errors.

Next, a second embodiment of the present invention will be described. Note that identical structures to the first embodiment are denoted by the identical reference numerals, and description thereof will be omitted. Description of identical operations and effects to those of the first embodiment will also be omitted.

Figure 12:
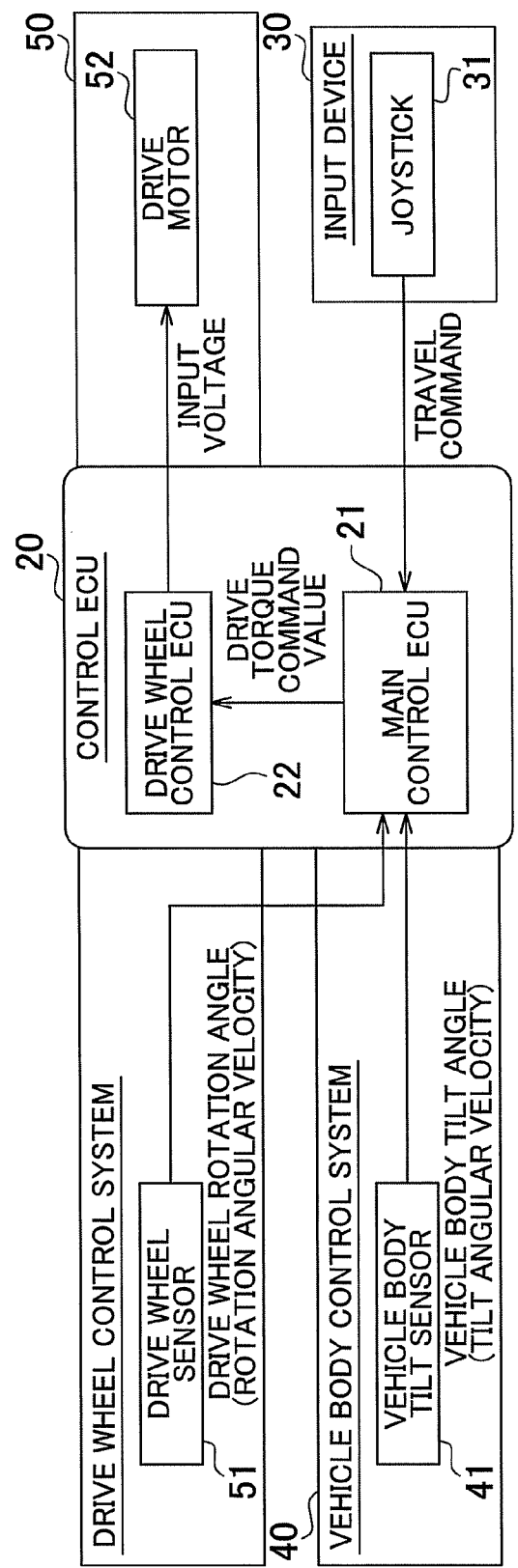
FIG. 12 is a block diagram showing the constitution of a control system for a vehicle according to a second embodiment of the present invention.
Figure 13:
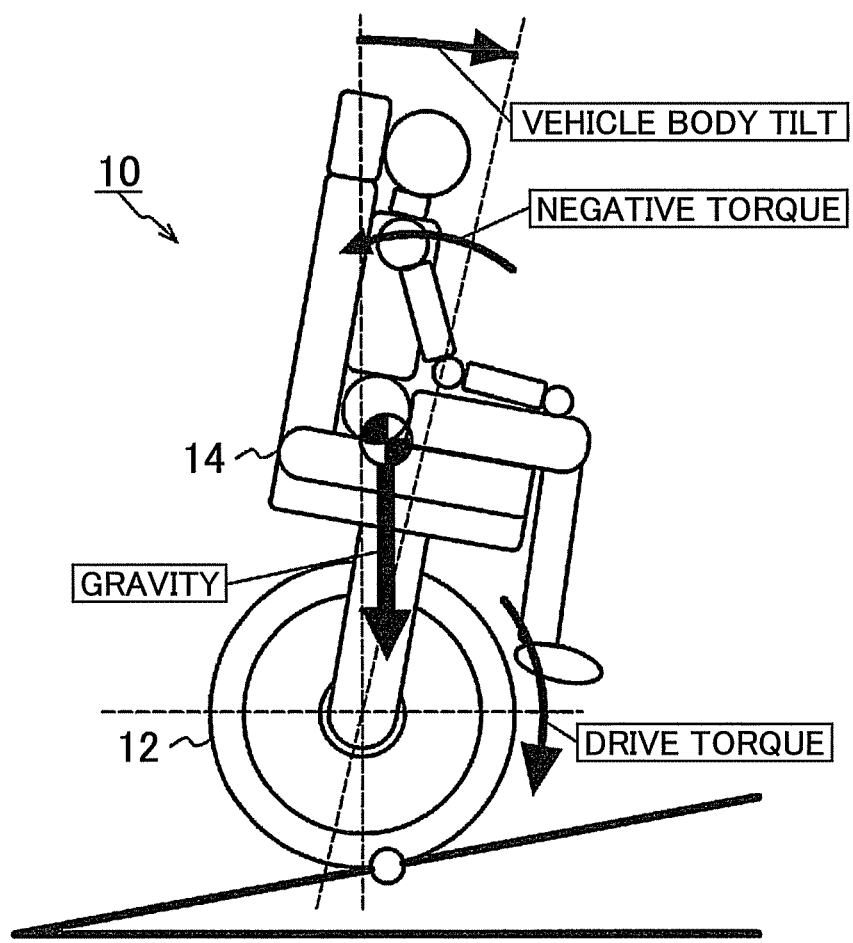
FIG. 13 is a schematic diagram showing an operation on a slope of the vehicle according to the second embodiment of the present invention.

FIG. 12 is a block diagram showing the constitution of a control system for a vehicle according to the second embodiment of the present invention, and FIG. 13 is a schematic diagram showing an operation of the vehicle according to the second embodiment of the present invention on a slope.

In the first embodiment, the carrying portion 14 is attached to the main body portion 11 to be capable of translating relative to the main body portion 11 in the front-rear direction of the vehicle 10, and thereby functions as the active weight portion. In this case, the movement mechanism including the active weight portion motor 62 is provided, and the carrying portion 14 is translated thereby. As a result, the structure of the carrying portion 14 becomes more complicated, leading to increases in cost and weight and an increase in the complexity of the control system. Furthermore, this constitution cannot be applied to an inverted-pendulum vehicle that does not include a movement mechanism for moving the carrying portion 14.

Therefore, in this embodiment, the movement mechanism for moving the carrying portion 14 is omitted. Further, as shown in FIG. 12, the active weight portion control system 60 is omitted from the control system, and the active weight portion control ECU 23, active weight portion sensor 61, and active weight portion motor 62 are also omitted. Note that in all other constitutions, the second embodiment is constituted identically to the first embodiment, and therefore description of these constitutions will be omitted.

In this embodiment, as shown in FIG. 13, balance is obtained in relation to the drive torque applied to the drive wheels 12 to stop the vehicle 10 on a slope, or in other words the vehicle body tilt torque generated by the negative torque that acts on the vehicle body as a reaction to the uphill torque, by tilting the vehicle body by an angle corresponding to the road surface gradient $\eta$ or the uphill torque such that the vehicle body tilt torque is canceled out by the action of gravity.

In a conventional vehicle such as that described in the "Background Art" section, the vehicle body may be tilted in the uphill direction of a slope, but this tilting is the result of lost balance, and when an attempt is made to stop the vehicle on a slope, for example, the vehicle may creep slowly downhill while the vehicle body remains tilted.

In this embodiment, on the other hand, tilt corresponding to the road surface gradient $\eta$ is applied to the vehicle body intentionally, and therefore appropriate balance can be maintained such that the vehicle can be stopped with stability even on a slope, for example.

Next, travel and attitude control processing according to this embodiment will be described in detail. Note that the outline of the travel and attitude control processing and the target travel state determination processing are identical to those in the first embodiment, and therefore description thereof will be omitted. Accordingly, only the state quantity acquisition processing, road surface gradient acquisition processing, target vehicle body attitude determination processing, and actuator output determination processing will be described. First, the state quantity acquisition processing will be described.

Figure 14:
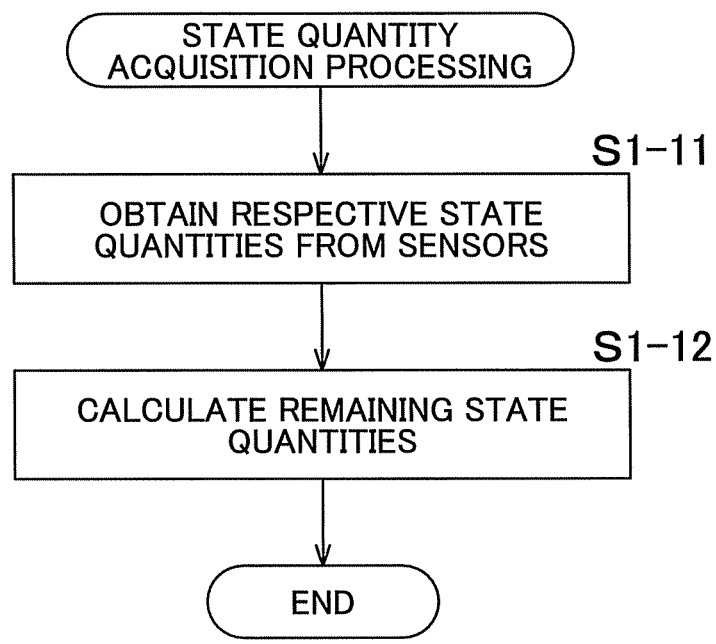
FIG. 14 is a flowchart showing an operation of a state quantity acquisition processing according to the second embodiment of the present invention.

FIG. 14 is a flowchart showing an operation of a state quantity acquisition processing according to the second embodiment of the present invention.

In the state quantity acquisition processing, first, the main control ECU 21 obtains the respective state quantities from the sensors (step S1-11). In this case, the drive wheel rotation angle $\theta_w$ and/or the rotation angular velocity $\dot{\theta}_w$ are obtained from the drive wheel sensor 51, and the vehicle body tilt angle $\theta_1$ and/or the tilt angular velocity $\dot{\theta}_1$ are obtained from the vehicle body tilt sensor 41.

Next, the main control ECU 21 calculates the remaining state quantities (step S1-12). In this case, the remaining state quantities are calculated by subjecting the obtained state quantities to temporal differentiation or temporal integration. For example, when the obtained state quantities are the drive wheel rotation angle $\theta_w$ and the vehicle body tilt angle $\theta_1$, the rotation angular velocity $\dot{\theta}_w$ and the tilt angular velocity $\dot{\theta}_1$ can be obtained by subjecting the obtained state quantities to temporal differentiation. Further, when the obtained state quantities are the rotation angular velocity $\dot{\theta}_w$ and the tilt angular velocity $\dot{\theta}_1$, for example, the drive wheel rotation angle $\theta_w$ and the vehicle body tilt angle $\theta_1$ can be obtained by subjecting the obtained state quantities to temporal integration.

Next, the road surface gradient acquisition processing will be described.

Figure 15:
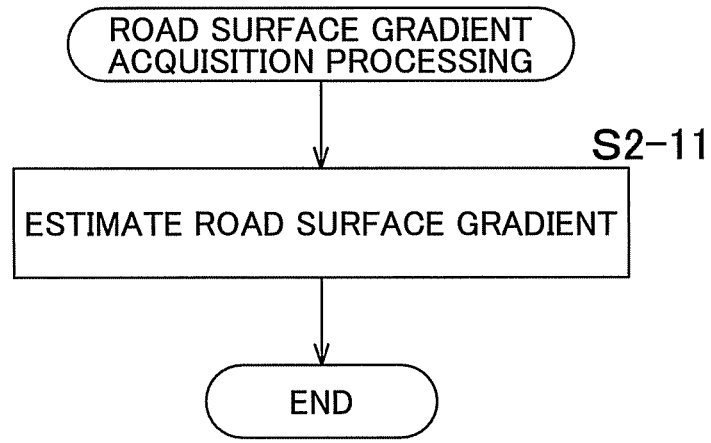
FIG. 15 is a flowchart showing an operation of a road surface gradient acquisition processing according to the second embodiment of the present invention.

FIG. 15 is an operation of a flowchart showing a road surface gradient acquisition processing according to the second embodiment of the present invention.

In the road surface gradient acquisition processing, the main control ECU 21 estimates the road surface gradient η (step S2-11). In this case, the road surface gradient η is estimated using a following Equation (8) on the basis of the respective state quantities obtained in the state quantity acquisition processing and the outputs of the respective actuators determined in the actuator output determination processing of the previous (one time step previous) travel and attitude control processing.

[Numeral 7]

$$\eta = \frac{1}{Mg}\left\{\frac{\tau_W}{R_W} - (\tilde{M}R_W\ddot{\theta}_W + m_1\ell_1\ddot{\theta}_1)\right\} \quad \text{Equation 8}$$

Here, $$M = m_1 + m_W, \quad \tilde{M} = M + \frac{I_W}{R_W^2}$$

are established.

Further, the acceleration values and $\ddot{\theta}_W$ and $\ddot{\theta}_1$ are determined by subjecting the rotation angular velocity $\dot{\theta}_W$ and the tilt angular velocity $\dot{\theta}_1$ to time differentiation.

Note that in Equation (8), a value obtained by multiplying the right side denominator by the left side, or in other words Mgη, represents external force.

Further, $$\frac{\tau_W}{R_W}$$

represents driving force, while $(\tilde{M}R_W(\tilde{M}R_W\ddot{\theta}_W + m_1\lambda_1\ddot{\theta}_1)$ represents inertial force. Furthermore, $\tilde{M}R_W\ddot{\theta}_W$ represents drive wheel translation inertial force, and $m_1\lambda_1\ddot{\theta}_1$ represents vehicle body tilt inertial force.

Hence, in this embodiment, the road surface gradient is estimated on the basis of the drive torque output by the drive motor 52 and the drive wheel rotation angular acceleration and vehicle body tilt angular acceleration serving as state quantities. In this case, the vehicle body tilt angular acceleration indicating attitude variation of the vehicle body is taken into consideration in addition to the drive wheel rotation angular acceleration indicating the rotation state of the drive wheels 12. In other words, the vehicle body attitude, which is a unique element of a so-called inverted-pendulum vehicle that employs attitude control of an inverted pendulum, is taken into account.

In the related art, the road surface gradient is estimated on the basis of the drive torque and the drive wheel rotation angular acceleration, and therefore, particularly when the attitude of the vehicle body varies greatly, a large error occurs in the estimated value of the road surface gradient. In this embodiment, however, the road surface gradient is estimated taking into account the vehicle body tilt angular acceleration indicating variation in the attitude of the vehicle body, and therefore a large error does not occur. As a result, the road surface gradient can be estimated with an extremely high degree of precision.

Similarly to the first embodiment, by applying a low pass filter to the estimated value of the road surface gradient, a high frequency component of the estimated value can be removed. In this case, a time lag occurs in the estimation, but oscillation caused by the high frequency component can be suppressed.

In this embodiment, external force generated by the driving force, the inertial force, and the road surface gradient is taken into account. However, rolling resistance of the drive wheels 12, viscous resistance caused by friction in the rotary shaft, air resistance acting on the vehicle 10, and so on may also be taken into account as secondary effects.

Further, a more accurate non-linear model or a model relating to the tilting motion of the vehicle body may be used. Note that a non-linear model may be provided in a map format to which a function is applied. Moreover, variation in the attitude of the vehicle body need not be taken into account in order to simplify calculation.

Next, the target vehicle body attitude determination processing will be described.

Figure 16:
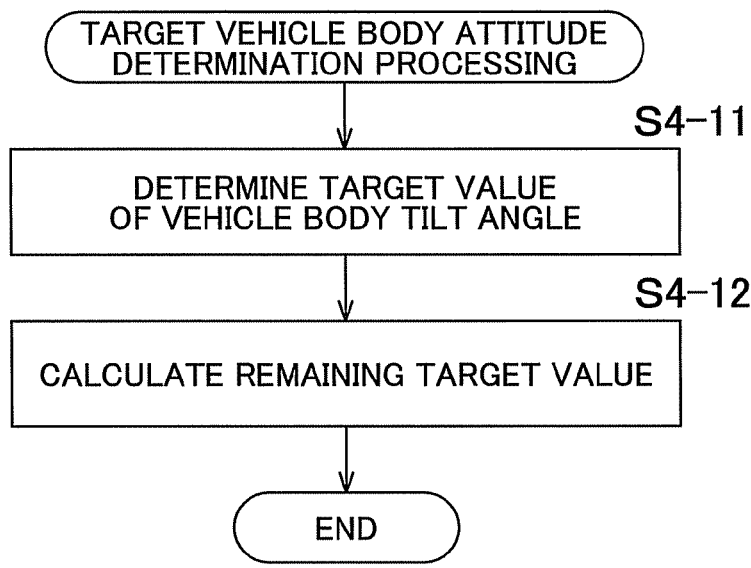
FIG. 16 is a flowchart showing an operation of a target vehicle body attitude determination processing according to the second embodiment of the present invention.

FIG. 16 is a flowchart showing an operation of a target vehicle body attitude determination processing according to the second embodiment of the present invention.

In the target vehicle body attitude determination processing, first, the main control ECU 21 determines a target value of the vehicle body tilt angle (step S4-11). In this case, the target value of the vehicle body tilt angle is determined using a following Equation (9) on the basis of the target value of the vehicle acceleration determined in the target travel state determination processing and the road surface gradient η obtained in the road surface gradient acquisition processing.

[Numeral 8]

The target value $\theta^*_1$ of the vehicle body tilt angle is expressed by the following Equation (9).

$$\theta^*_1 = \theta_{1,\alpha}^* + \theta hd\ 1,\eta \quad \text{Equation 9}$$

Here, $$\theta_{1,\alpha}^* = \frac{m_1 \ell_1 + \tilde{M} R_W}{m_1 \ell_1} \alpha^*, \quad \theta_{1,\eta} = \frac{M R_W}{m_1 \ell_1} \eta,$$

are established.

Further, $\theta_{1,\alpha}^*$ is a required vehicle body tilt angle for balancing the vehicle body relative to the inertial force and drive motor negative torque accompanying vehicle acceleration, or in other words a tilt angle for canceling out the effect of acceleration/deceleration of the vehicle 10.

On the other hand, $\theta_{1,\eta}$ is a required vehicle body tilt angle for balancing the vehicle body relative to negative torque of uphill torque corresponding to the road surface gradient $\eta$, or in other words a tilt angle for canceling out the effect of the road surface gradient $\eta$.

Next, the main control ECU 21 calculates the remaining target values (step S4-12). In other words, the main control ECU 21 calculates target values of the drive wheel rotation angle and the vehicle body tilt angular velocity by temporally differentiating or temporally integrating the respective target values.

Hence, in this embodiment, the target value of the vehicle body attitude, or in other words the target value of the vehicle body tilt angle, is determined taking into account not only the inertial force and drive motor negative torque that act on the vehicle body as the vehicle 10 accelerates, but also the negative torque that acts on the vehicle body in accordance with the uphill torque corresponding to the road surface gradient $\eta$.

At this time, the center of gravity of the vehicle body is moved such that the vehicle body tilt torque is canceled out by the action of gravity. For example, when the vehicle 10 accelerates or travels uphill, the vehicle body is tilted forward. Further, when the vehicle 10 decelerates or travels downhill, the vehicle body is tilted backward.

In this embodiment, equations based on a linearized dynamic model are used, but equations based on a more accurate non-linear model or a model that takes viscous resistance into account may be used instead. Note that when the equations are non-linear, they may be provided in a map format to which a function is applied.

Next, the actuator output determination processing will be described.

Figure 17:
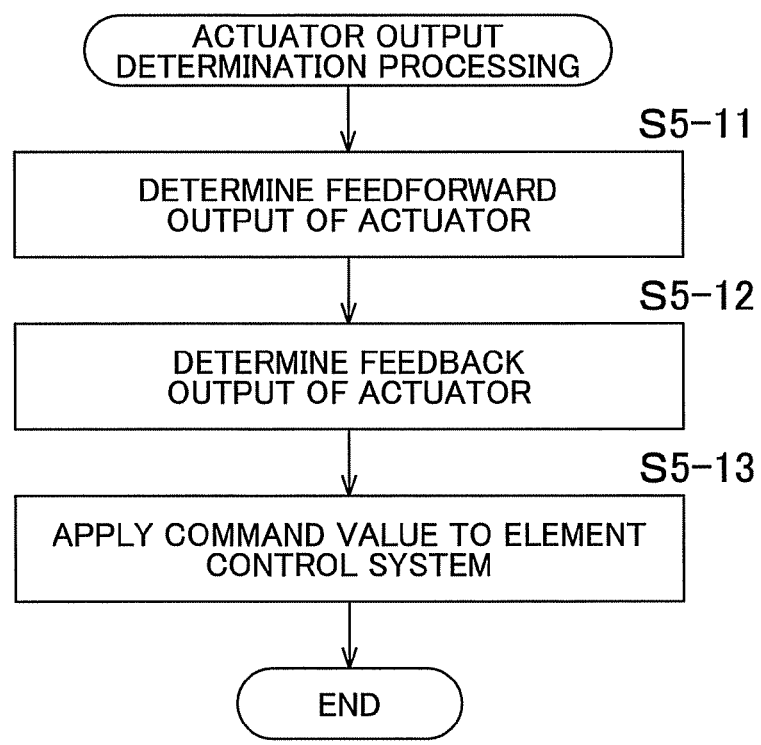
FIG. 17 is a flowchart showing an operation of an actuator output determination processing according to the second embodiment of the present invention.

FIG. 17 is a flowchart showing an operation of an actuator output determination processing according to the second embodiment of the present invention.

In the actuator output determination processing, first, the main control ECU 21 determines a feedforward output of the actuator (step S5-11). In this case, the feedforward output of the drive motor 52 is determined from the target values and the road surface gradient $\eta$ using Equation (4) described in the first embodiment.

As shown in Equation (4), by adding the uphill torque corresponding to the road surface gradient $\eta$ automatically, a similar steering feeling to that obtained on level ground can be provided on a slope. In other words, the vehicle 10 does not move even when the passenger 15 releases the joystick 31 after stopping on a slope. Furthermore, similar acceleration/deceleration to that obtained on level ground can be achieved in relation to an identical steering operation of the joystick 31 performed on a slope.

In this embodiment, more precise control is realized by applying the feedforward output logically. However, if necessary, the feedforward output may be omitted. In this case, a value approximating the feedforward output is applied indirectly together with a steady-state deviation through feedback control. Further, the steady-state deviation may be reduced by applying an integral gain.

Next, the main control ECU 21 determines a feedback output of the actuator (step S5-12). In this case, the feedback output of the drive motor 52 is determined from a deviation between each target value and the corresponding actual state quantity using a following Equation (10).

[Numeral 9]

The feedback output $\tau_{W,F,B}$ of the drive motor 52 is expressed by the following Equation (10).

$$\tau_{W,FB} = -K_{W1}(\theta_W - \theta^*_W) - K_{W2}(\dot{\theta}_W - \dot{\theta}^*_W) - K_{W3}(\theta_1 - \theta^*_1) - K_{W4}(\dot{\theta}_1 - \dot{\theta}^*_1) \quad \text{Equation 10}$$

Here, $K_{W1}$ to $K_{W4}$ are feedback gains, the values of which are set in advance as the value of an optimum regulator, for example. Note that * denotes a target value.

Note that non-linear feedback control such as sliding mode control may also be introduced. Furthermore, to simplify the control, some of the feedback gains, excluding $K_{W2}$ and $K_{W3}$, may be set at zero. Moreover, an integral gain may be introduced to eliminate the steady-state deviation.

Finally, the main control ECU 21 applies a command value to the element control system (step S5-13). In this case, the main control ECU 21 transmits the sum of the feedforward output and feedback output determined in the manner described above to the drive wheel control ECU 22 as a drive torque command value.

Hence, in this embodiment, balance is maintained on a slope by tilting the vehicle in the uphill direction. Therefore, this embodiment can be applied to an inverted-pendulum vehicle that does not include a movement mechanism for moving the carrying portion 14. Furthermore, the structure and control system can be simplified, and therefore a reasonably priced, lightweight inverted-pendulum vehicle can be realized.

Next, a third embodiment of the present invention will be described. Note that identical structures to the first and second embodiments are denoted by the identical reference numerals, and description thereof will be omitted. Description of identical operations and effects to those of the first and second embodiments will also be omitted.

Figure 18A:
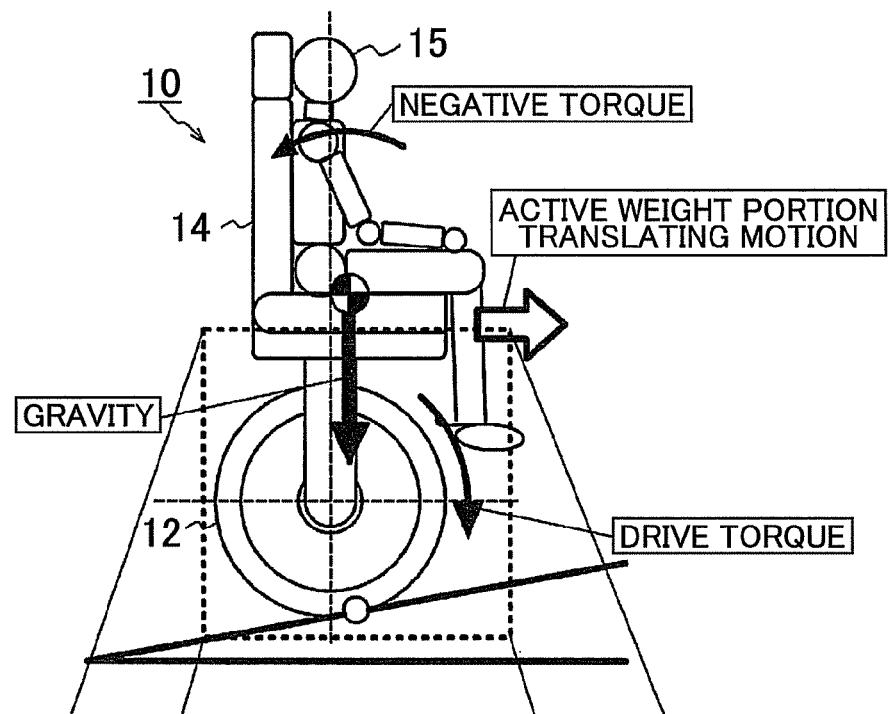
FIG. 18 is a schematic diagram showing the constitution of a vehicle according to a third embodiment of the present invention, and a view showing a state in which the vehicle is stationary on a slope.
Figure 18B:
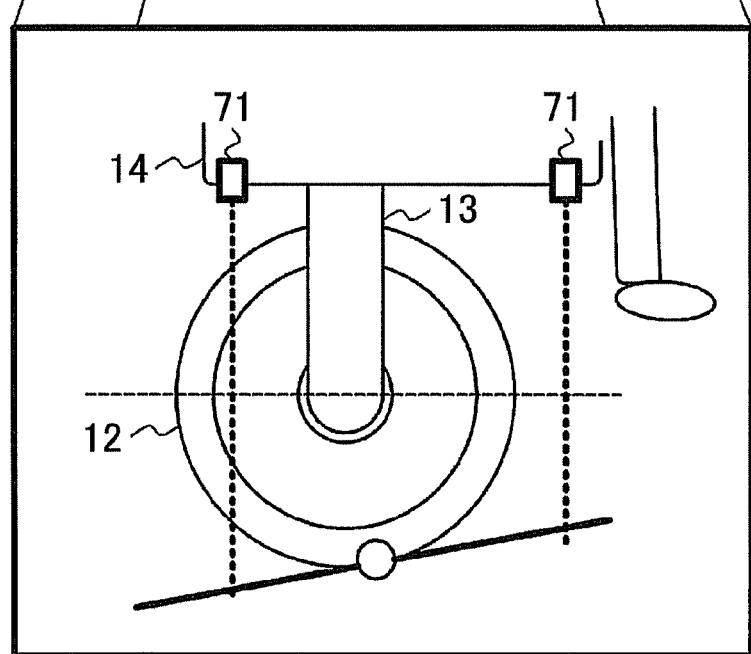

FIG. 18 is a schematic diagram showing the constitution of a vehicle according to the third embodiment of the present invention, and a view showing a state in which the vehicle is stationary on a slope. FIG. 19 is a block diagram showing the constitution of a control system for the vehicle according to the third embodiment of the present invention. FIG. 18B is an enlarged view of the main parts of FIG. 18A.

In this embodiment, the road surface gradient $\eta$ is measured, and the vehicle 10 is controlled on the basis of the measurement value. When the road surface gradient $\eta$ is obtained by estimation, errors and time lags may occur. Moreover, when the vehicle 10 contacts an obstacle, the obstacle may be recognized erroneously as an uphill slope.

Hence, in this embodiment, the road surface gradient $\eta$ is measured by a sensor, and the uphill torque and movement amount of the active weight portion are determined on the basis of the measurement value. For this purpose, the vehicle 10 is provided with a distance sensor 71 serving as a road surface gradient measurement sensor, as shown in FIG. 18. The distance sensor 71 employs laser light, for example, but any type of sensor may be used. In the example shown in FIG. 18, two distance sensors 71 are disposed separately on the front and rear sides of a lower surface of the carrying portion 14 so as to measure the distance from the lower surface of the carrying portion 14 to the road surface. Preferably, one of the distance sensors 71 is positioned to the front of a portion at which the drive wheel 12 contacts the road surface, and the other distance sensor 71 is positioned to the rear of the portion at which the drive wheel 12 contacts the road surface. Thus, the two distance sensors 71 measure the distance to the road surface in positions removed from each other to the front and rear, and therefore the road surface gradient η can be calculated on the basis of a difference between the distances measured by the respective distance sensors 71.

Further, as shown in FIG. 19, the vehicle 10 includes a road surface gradient measurement system 70 including the distance sensors 71. The distance sensors 71 detect a ground distance as the distance to the road surface at two points, i.e. to the front and rear, and transmit the detected distances to the main control ECU 21.

Next, travel and attitude control processing according to this embodiment will be described in detail. Note that the outline of the travel and attitude control processing, the state quantity acquisition processing, the target travel state determination processing, the target vehicle body attitude determination processing, and the actuator output determination processing are identical to those in the first embodiment, and therefore description thereof will be omitted. Accordingly, only the road surface gradient acquisition processing will be described.

Figure 20:
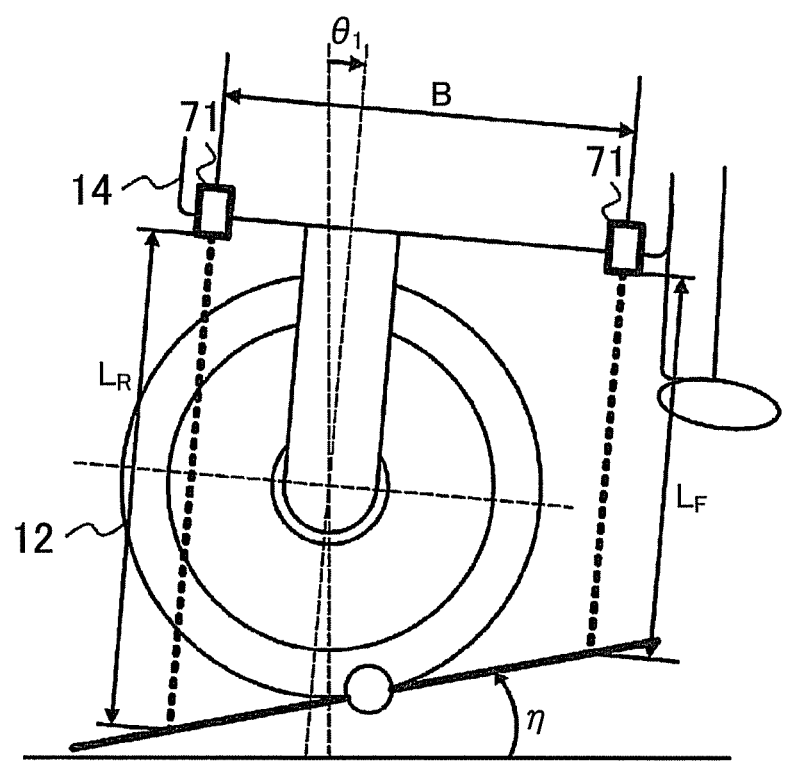
FIG. 20 is a view showing a geometrical condition during road surface gradient acquisition according to the third embodiment of the present invention.

FIG. 20 is a view showing a geometrical condition during road surface gradient acquisition according to the third embodiment of the present invention, and FIG. 21 is a flowchart showing an operation of a road surface gradient acquisition processing according to the third embodiment of the present invention.

In the road surface gradient acquisition processing, first, the main control ECU 21 obtains measurement values from the distance sensors 71 (step S2-21). In this case, ground distance measurement values are obtained from the front and rear distance sensors 71.

Next, the main control ECU 21 calculates the road surface gradient η (step S2-22). In this case, the road surface gradient is calculated from the front and rear ground distances and the vehicle body tilt angle $\theta_1$ using a following Equation (11).

[Numeral 10]

$$\eta = \frac{L_R - L_F}{B} - \theta_1 \quad \text{Equation 11}$$

Here, $L_R$ is the ground distance measured by the distance sensor 71 disposed at the rear, $L_F$ is the ground distance measured by the distance sensor 71 disposed at the front, and B is a distance between the distance sensors 71 disposed to the front and rear.

Hence, in this embodiment, the road surface gradient η is determined on the basis of the ground distances measured by the distance sensors 71 disposed on the front and rear sides of the lower surface of the carrying portion 14. Note that in this case, the value of the road surface gradient η is corrected taking into account the vehicle body tilt angle $\theta_1$.

Further, in this embodiment, a linear approximated equation is used as Equation (11), but a more precise non-linear equation may be used. Moreover, the effects of the movement velocity of the vehicle 10 and the tilt angular velocity $\dot{\theta}_1$ of the vehicle body may be taken into account. Furthermore, the road surface gradient η may be determined using another measurement system. For example, a camera may be provided such that the road surface gradient η is determined on the basis of image data from the camera, or road surface gradient data may be obtained on the basis of a GPS (Global Positioning System) and map data.

Furthermore, when the vehicle 10 is stationary, the road surface gradient η may be determined more accurately by measuring the ground distance continuously while moving the carrying portion 14 forward and backward. For example, when an obstacle such as a stone exists on the road surface and one of the distance sensors 71 happens to be positioned directly above the obstacle, the distance to the obstacle, which is shorter than the actual ground distance, is measured by mistake, and as a result, an error occurs in the road surface gradient η determined in accordance therewith. However, by measuring the ground distance continuously while moving the carrying portion 14 forward and backward, the ground distance to the front and rear of the obstacle can be measured, and as a result, the effect of the obstacle can be eliminated.

Hence, in this embodiment, the road surface gradient η is measured using a sensor. As a result, a time lag does not occur during acquisition of the road surface gradient η. Moreover, when the vehicle 10 contacts an obstacle, the obstacle is not recognized erroneously as an uphill slope.

Further, the road surface gradient η may be obtained using both estimation and measurement by a sensor. For example, the value measured by the sensor and the estimated value may be compared to determine whether the sensor is normal or abnormal, and when an abnormality occurs, the estimated value may be used.

The present invention is not limited to the embodiments described above, and may be subjected to various amendments that are based on the spirit of the present invention and do not depart from the scope of the present invention.

INDUSTRIAL APPLICABILITY

The present invention may be applied to a vehicle that employs attitude control of an inverted pendulum.

The invention claimed is:

1. An inverted pendulum vehicle comprising:
a drive wheel attached rotatably to a vehicle body;
a drive motor for rotatably driving the drive wheel; and
a vehicle control device that controls an attitude of the vehicle body by controlling a drive torque applied to the drive wheel by the drive motor,
wherein the vehicle control device estimates a road surface gradient on the basis of drive torque output by the drive motor, drive wheel angular acceleration, and vehicle body tilt angular acceleration, and
wherein the vehicle control device corrects the drive torque in accordance with the estimated road surface gradient.

2. The inverted pendulum vehicle according to claim 1 further comprising an active weight portion attached movably to the vehicle body,
wherein the vehicle control device controls the attitude of the vehicle body by controlling at least one of the drive torque and a position of the active weight portion, and estimates the road surface gradient taking a tilt angle of the vehicle body and the position of the active weight portion into consideration as the attitude of the vehicle body.

3. The inverted pendulum vehicle according to claim 2, wherein the vehicle control device estimates the road surface gradient assuming that an external force that acts of the vehicle body in proportion to the road surface gradient is equal to a difference between a driving force and an inertial force of the drive wheel.

4. The inverted pendulum vehicle according to claim 1, further comprising an active weight portion attached movably to the vehicle body,
wherein the vehicle control device controls the attitude of the vehicle body by controlling at least one of the drive torque and a position of the active weight portion, and estimates the road surface gradient taking a tilt angle of the vehicle body and the position of the active weight portion into consideration as the attitude of the vehicle body.

5. The inverted pendulum A vehicle according to claim 1, wherein the vehicle control device estimates the road surface gradient assuming that an external force that acts of the vehicle body in proportion to the road surface gradient is equal to a difference between a driving force and an inertial force of the drive wheel.

6. The inverted pendulum vehicle according to claim 1 further comprising a vehicle tilt sensor which outputs vehicle body tilt angle or tilt angular velocity to the vehicle control device which converts the output from the vehicle tilt sensor to the tilt angular acceleration.

7. The inverted pendulum vehicle according to claim 1 further comprising a vehicle tilt sensor which outputs vehicle body tilt angle or tilt angular velocity to the vehicle control device and a drive wheel sensor which outputs wheel rotation angle or rotation angular velocity to the vehicle control device and wherein the vehicle control device converts the output from the vehicle tilt sensor to the tilt angular acceleration and converts output from the drive wheel sensor to the drive wheel rotation angular acceleration.

* * * * *